Figure 6:
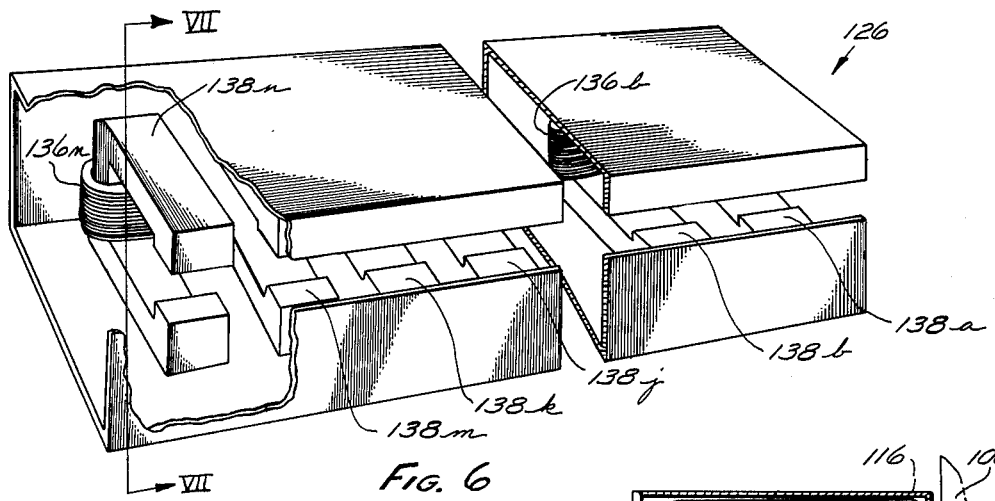

July 12, 1966 C. H. VANDER MEER 3,260,349
CODED CARRIER CONVEYOR SYSTEM
Original Filed March 24, 1961 15 Sheets-Sheet 1
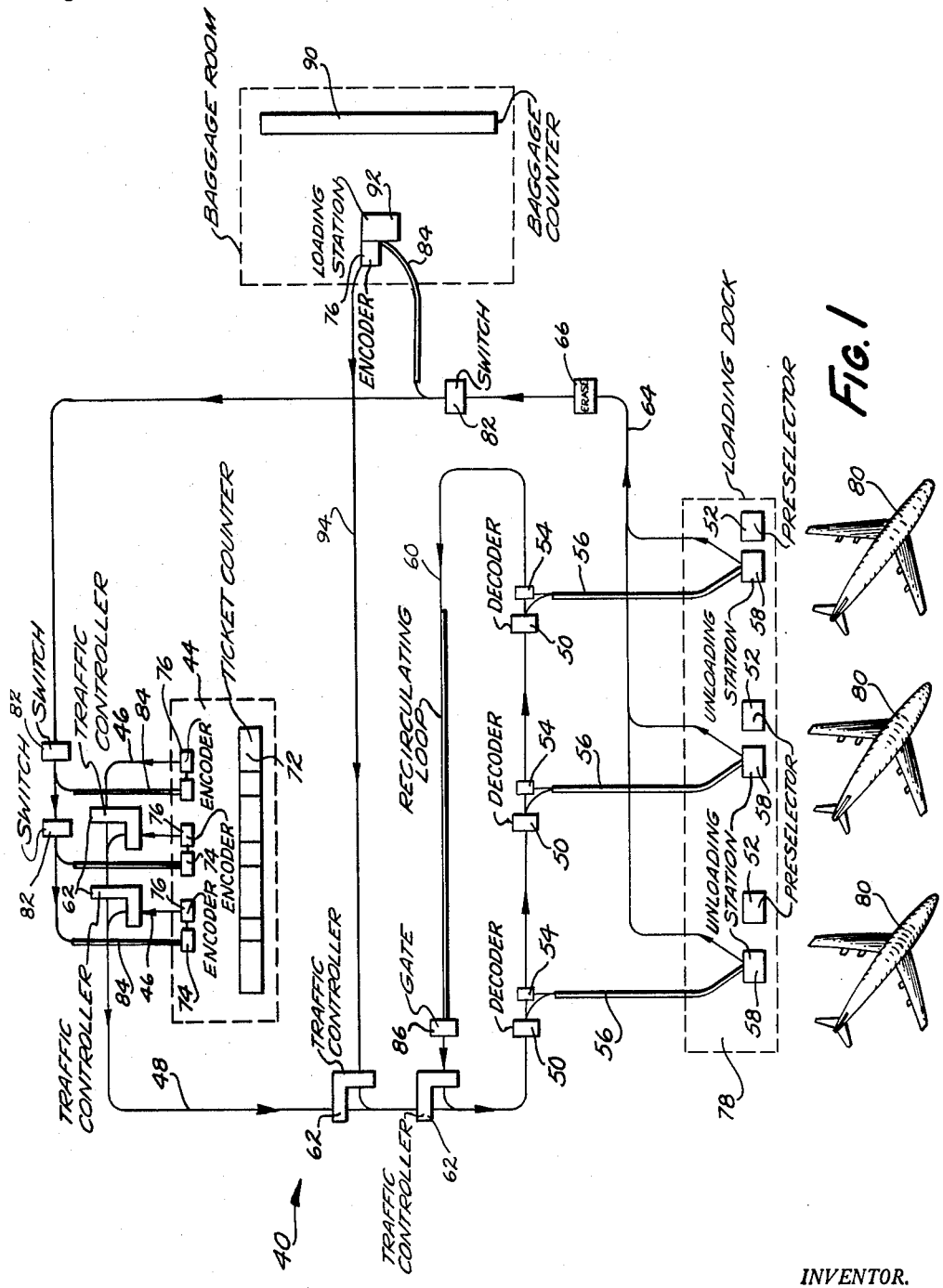
*INVENTOR.*
CLAYTON H. VANDER MEER
BY
*ATTORNEYS*

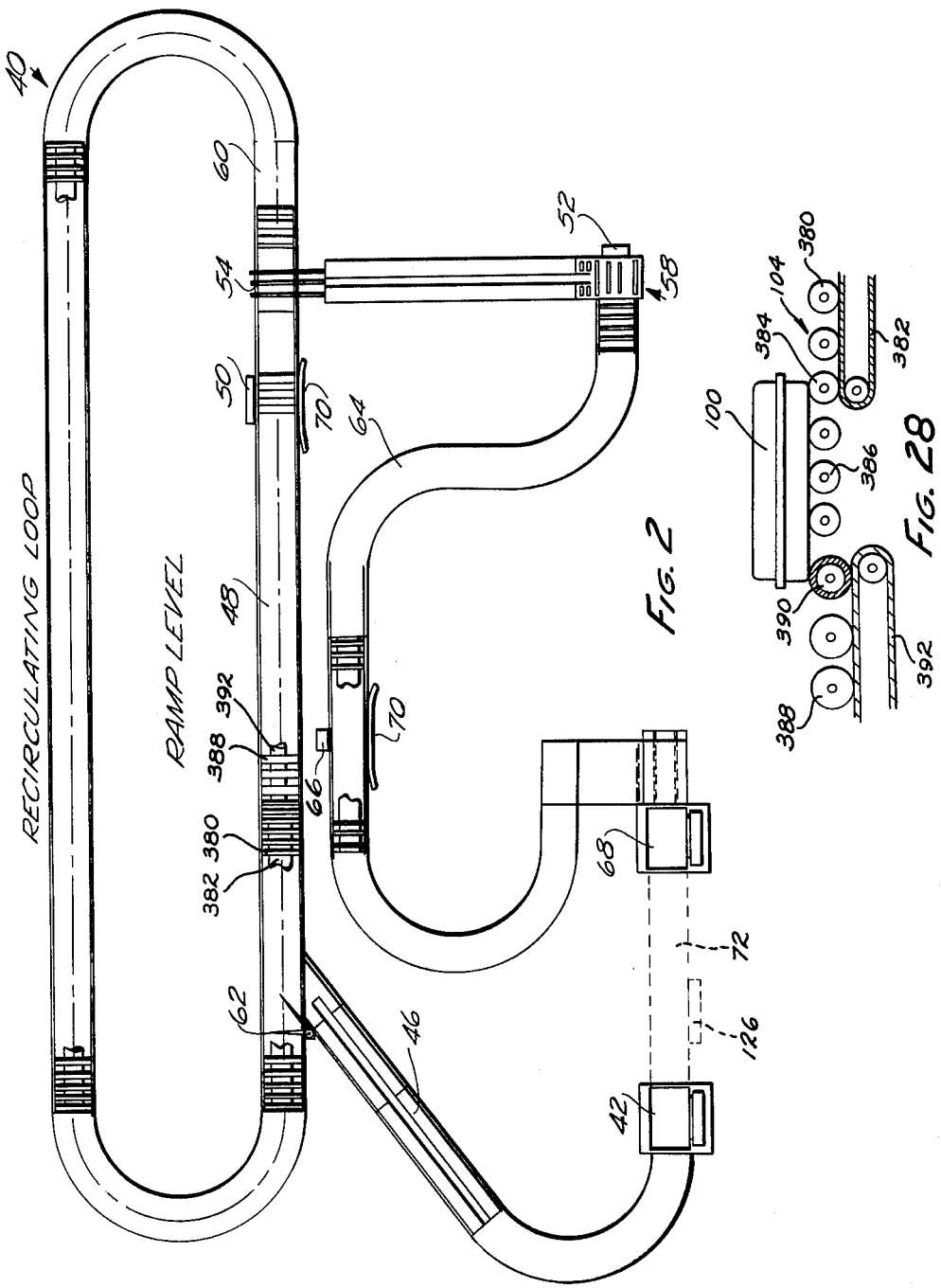

July 12, 1966  C. H. VANDER MEER  3,260,349
CODED CARRIER CONVEYOR SYSTEM
Original Filed March 24, 1961  15 Sheets-Sheet 3
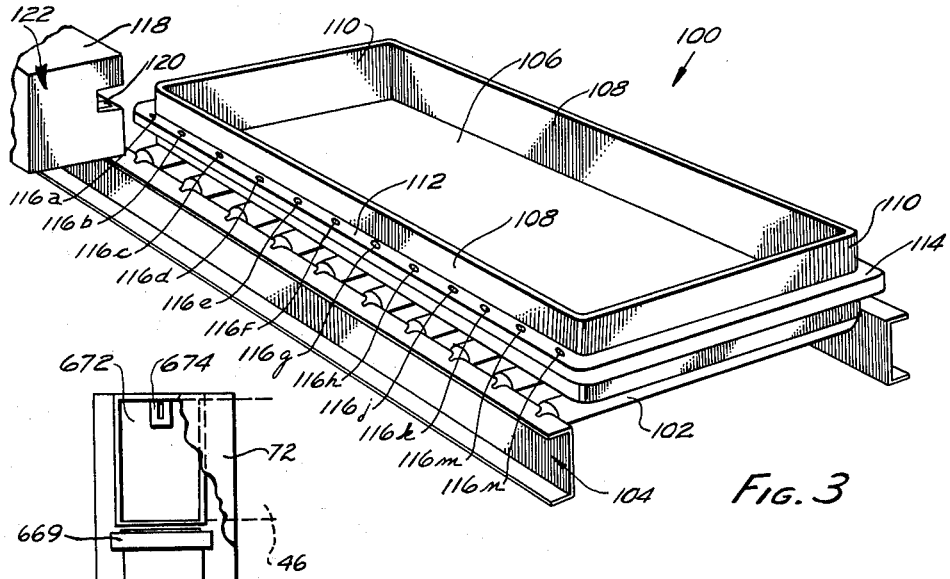
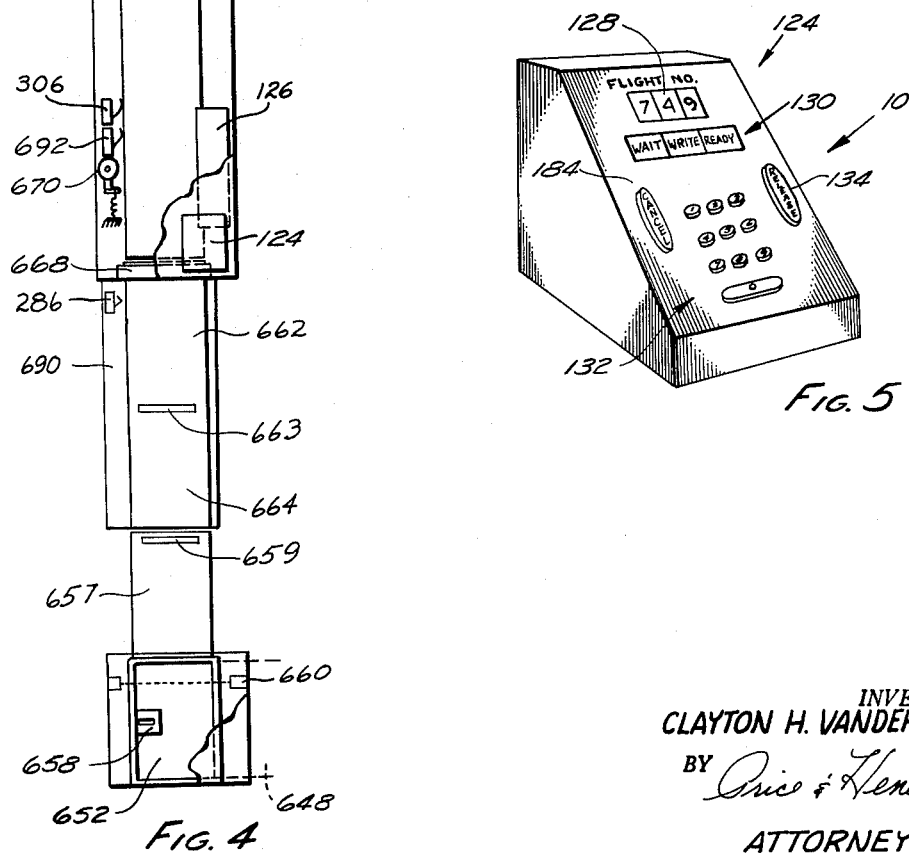
INVENTOR.
CLAYTON H. VANDER MEER
BY
ATTORNEYS July 12, 1966  C. H. VANDER MEER  3,260,349
CODED CARRIER CONVEYOR SYSTEM
Original Filed March 24, 1961  15 Sheets-Sheet 4

INVENTOR.
CLAYTON H. VANDER MEER
BY
ATTORNEYS

July 12, 1966   C. H. VANDER MEER   3,260,349
CODED CARRIER CONVEYOR SYSTEM
Original Filed March 24, 1961   15 Sheets-Sheet 5

FLIGHT NUMBER

INVENTOR.
CLAYTON H. VANDER MEER
BY
ATTORNEYS

INVENTOR.
CLAYTON H. VANDER MEER

July 12, 1966 C. H. VANDER MEER 3,260,349
CODED CARRIER CONVEYOR SYSTEM
Original Filed March 24, 1961 15 Sheets-Sheet 9

INVENTOR.
CLAYTON H. VANDER MEER
BY
ATTORNEYS

July 12, 1966 C. H. VANDER MEER 3,260,349
CODED CARRIER CONVEYOR SYSTEM
Original Filed March 24, 1961 15 Sheets-Sheet 10

INVENTOR.
CLAYTON H. VANDER MEER
BY
ATTORNEYS

July 12, 1966 C. H. VANDER MEER 3,260,349
CODED CARRIER CONVEYOR SYSTEM
Original Filed March 24, 1961 15 Sheets-Sheet 11

INVENTOR.
CLAYTON H. VANDER MEER
BY Price & Heneveld
ATTORNEYS

July 12, 1966  C. H. VANDER MEER  3,260,349
CODED CARRIER CONVEYOR SYSTEM
Original Filed March 24, 1961  15 Sheets-Sheet 12

INVENTOR.
CLAYTON H. VANDER MEER
BY
ATTORNEYS

July 12, 1966 C. H. VANDER MEER 3,260,349
CODED CARRIER CONVEYOR SYSTEM
Original Filed March 24, 1961 15 Sheets-Sheet 14

INVENTOR.
CLAYTON H. VANDER MEER
BY
ATTORNEYS

July 12, 1966 C. H. VANDER MEER 3,260,349
CODED CARRIER CONVEYOR SYSTEM
Original Filed March 24, 1961 15 Sheets-Sheet 15

INVENTOR.
CLAYTON H. VANDER MEER
BY
ATTORNEYS

United States Patent Office 3,260,349
Patented July 12, 1966

3,260,349
CODED CARRIER CONVEYOR SYSTEM
Clayton H. Vander Meer, Wyoming, Mich., assignor to The Rapids-Standard Company, Inc., Grand Rapids, Mich., a corporation of Michigan
Continuation of application Ser. No. 98,137, Mar. 24, 1961. This application Oct. 4, 1965, Ser. No. 496,245
5 Claims. (Cl. 198—38)

This application is a continuation of co-pending application Serial No. 98,137, filed March 24, 1961 which is a continuation-in-part of application Serial No. 15,939, filed March 18, 1960 and entitled "Conveyor System," both of which are now abandoned.

This application relates to materials handling systems, and more particularly to conveyor systems of the "flowing storage" type.

In recent years, the materials handling industry has been called upon to provide equipment for the automation of materials handling in fields hitherto largely reserved to manual labor. In some of these fields, an example of which is the field of airline baggage handling, it has become necessary to provide equipment which can receive goods earmarked for a variety of ultimate destinations at one or more receiving stations in any order and at any time; to deliver these goods over a central conveying system to one or more destination stations such as the loading platforms at an airline terminal which are from time to time associated with different carriers or airplanes which carry the goods to their ultimate destinations; storing those goods which are fed into the system at a time when none of the destination stations is associated with a carrier going to their ultimate destination; releasing the stored goods to a destination station when it becomes associated with a carrier going to the proper ultimate destination; and returning to the originating station the containers for the goods in those cases where marking of the goods themselves is impractical or undesirable.

The present invention achieves this result by the use of a "flowing storage" or recirculating conveyor which periodically passes all the coded goods or objects in the conveyor system through a decoding mechanism which causes objects marked with a given code to be ejected from the recirculating loop toward a destination station when and only when that destination station is ready to accept objects with that code.

In airline baggage handling, for which the embodiment described in this application is designed, the individual baggage items are preferably placed on trays equipped with magnetizable slugs onto which a magnetic code can be impressed, the code being representative of the number of the flight onto which the piece of baggage is to be loaded. As long as the flight in question has not yet arrived at the terminal, any baggage for that flight is fed into the "flowing storage" or recirculating portion of the conveyor system. When the flight in question arrives, the mechanism is set up to select from all the baggage in the conveyor system those pieces which are to go on the flight in question, and to convey them to the destination station located at the loading platform at which the flight in question is parked. The empty trays are then returned to the originating station or ticket counter after having the magnetic code thereon erased so that they are reusable for another piece of baggage.

Other aspects of this invention are concerned with novel mechanical and electrical devices and circuitry which enable the system to function in the manner described.

It is therefore the basic object of this invention to provide a conveyor system in which objects can be selectively conveyed from an originating station to a destination station if the destination is ready to receive them, or stored and periodically recirculated for eventual delivery if and when the destination station becomes ready to receive them.

It is a further object of this invention to provide a closed-loop conveyor with selectably codable paths in which a coded object is automatically recirculated until the code of one of said paths is made to correspond to the code of the object.

It is a still further object of this invention to provide a system of the type described above in which magnetic destination codes can be repeatedly impressed on free-cycling, reusable containers.

It is another object of this invention to provide such a system in which the magnetic code is impressed on elements positioned longitudinally with respect to the direction of travel of the container.

It is still another object of this application to provide an electrical control structure and circuitry for achieving control of the conveyor system in accordance with the principles described above.

Figure 7:
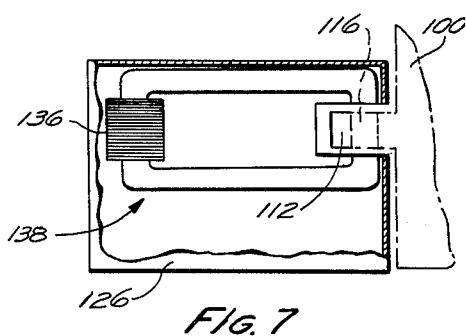
Figure 13:
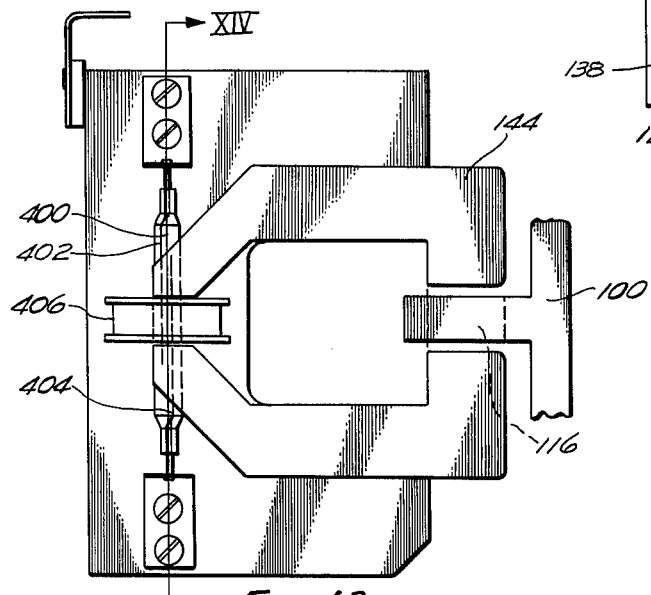
Figure 14:
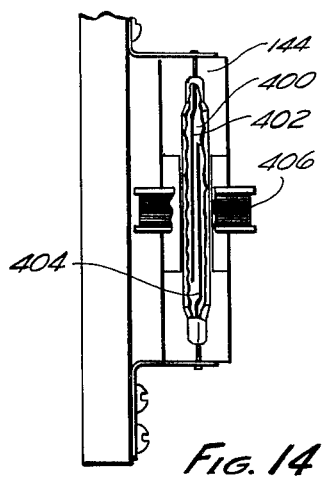
Figure 12:
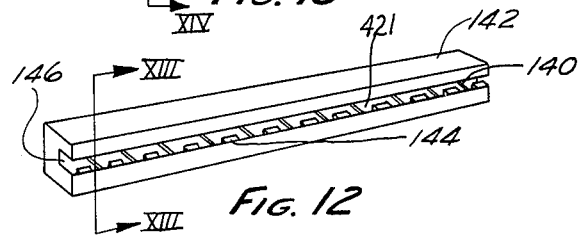
Figure 24:
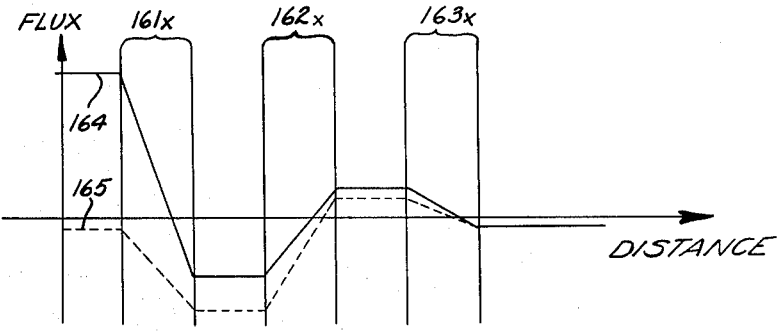
Figure 8:
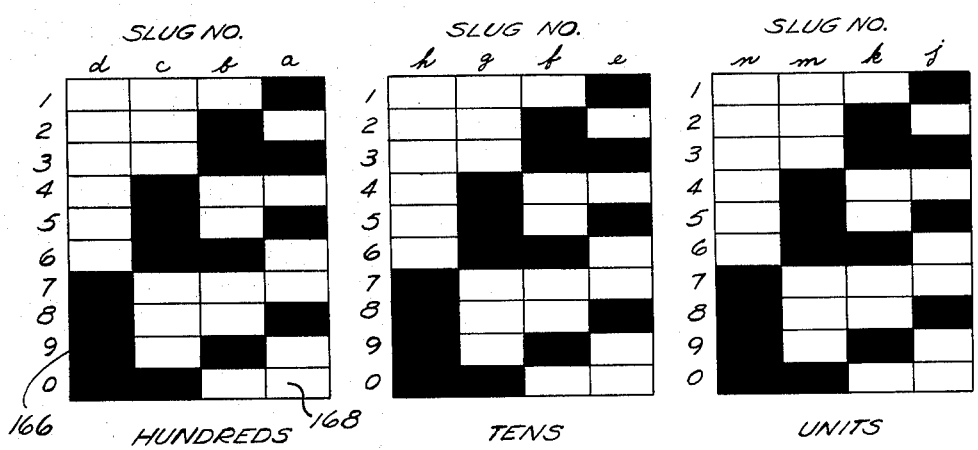
Figure 29:
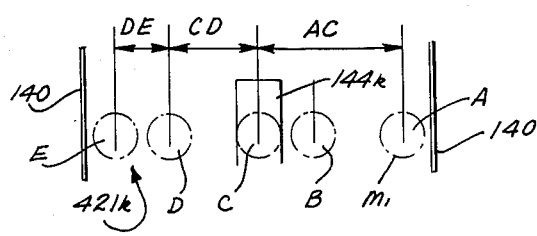
Figure 9:
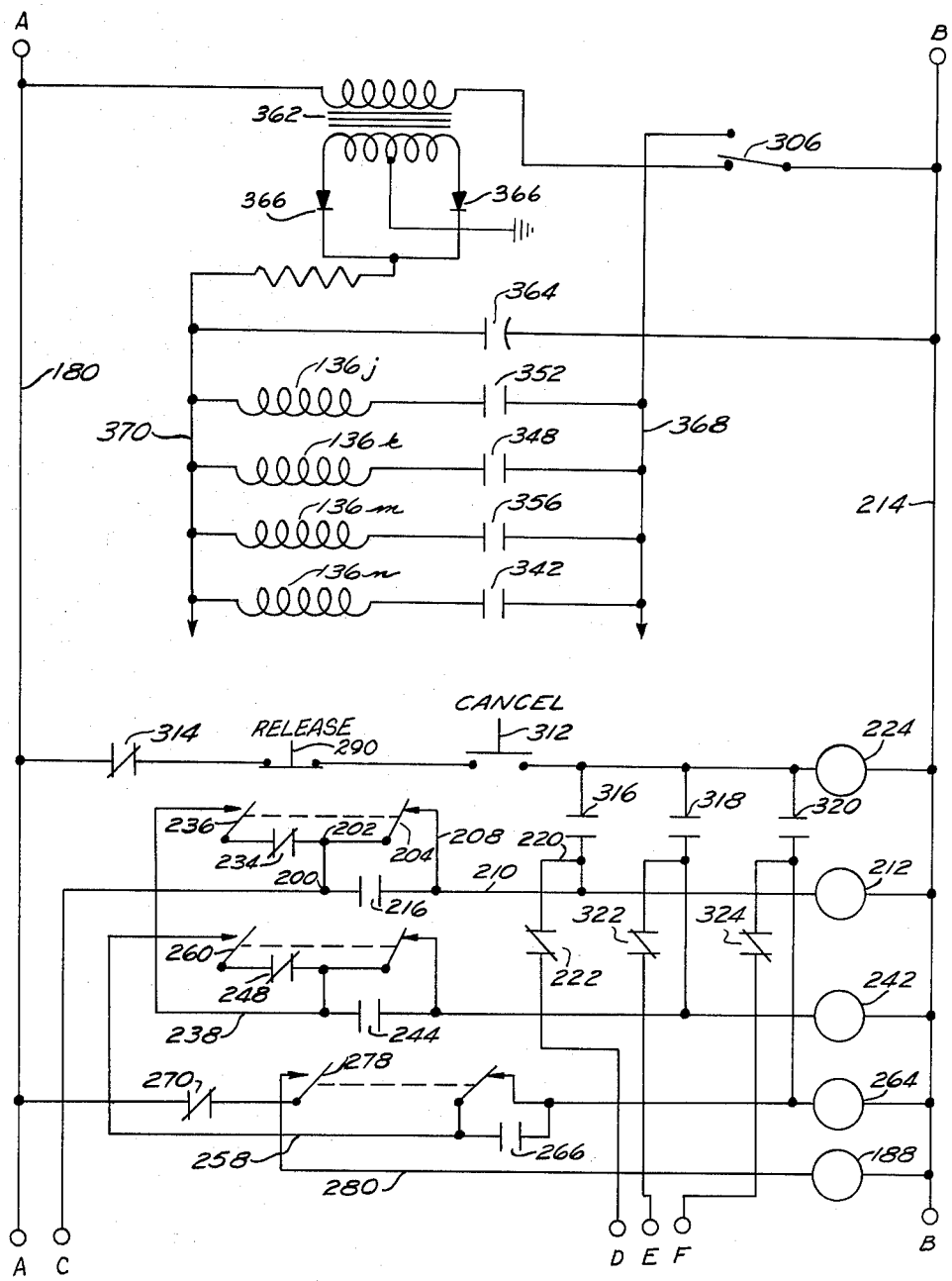
Figure 10:
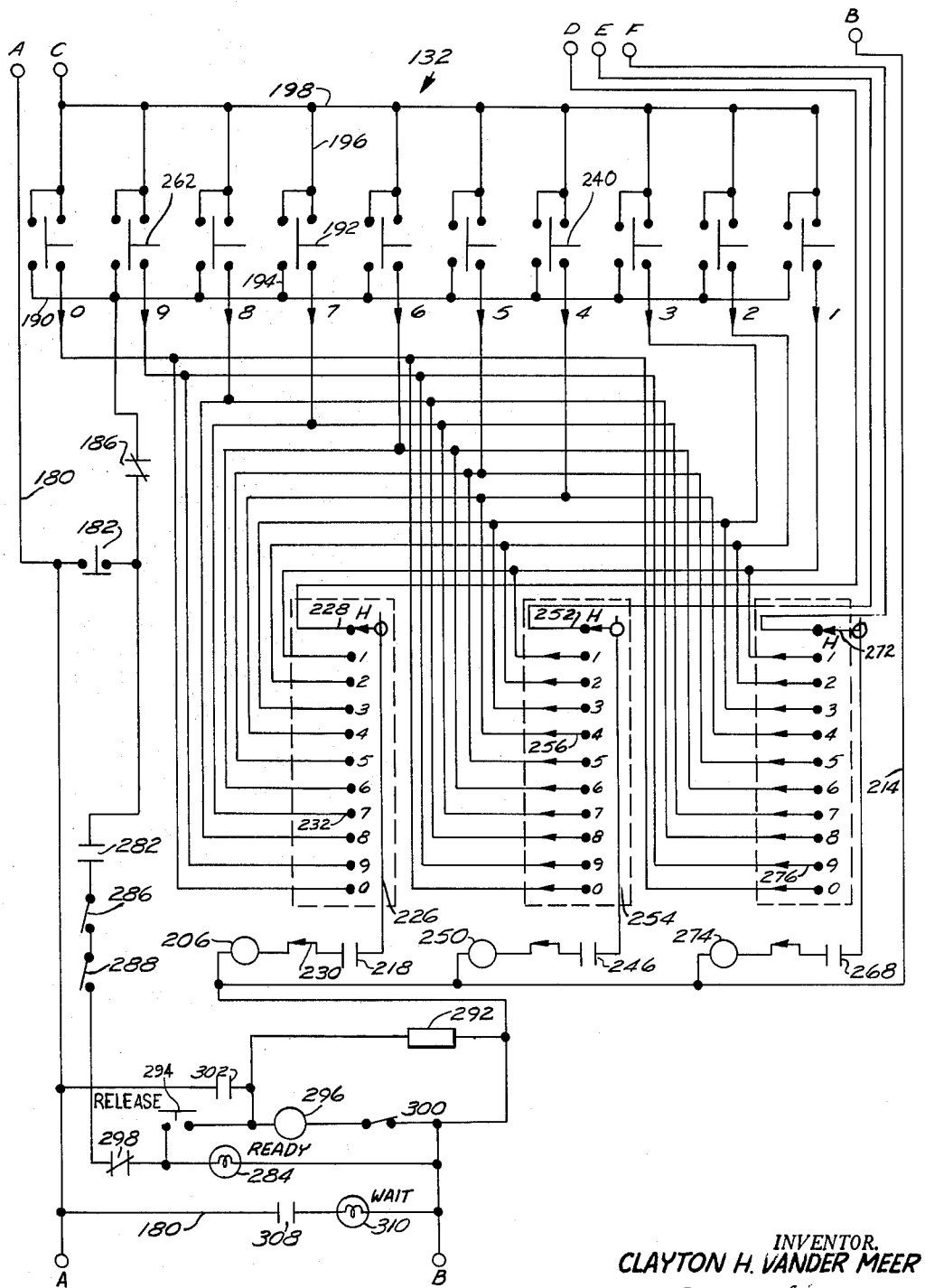
Figure 11:
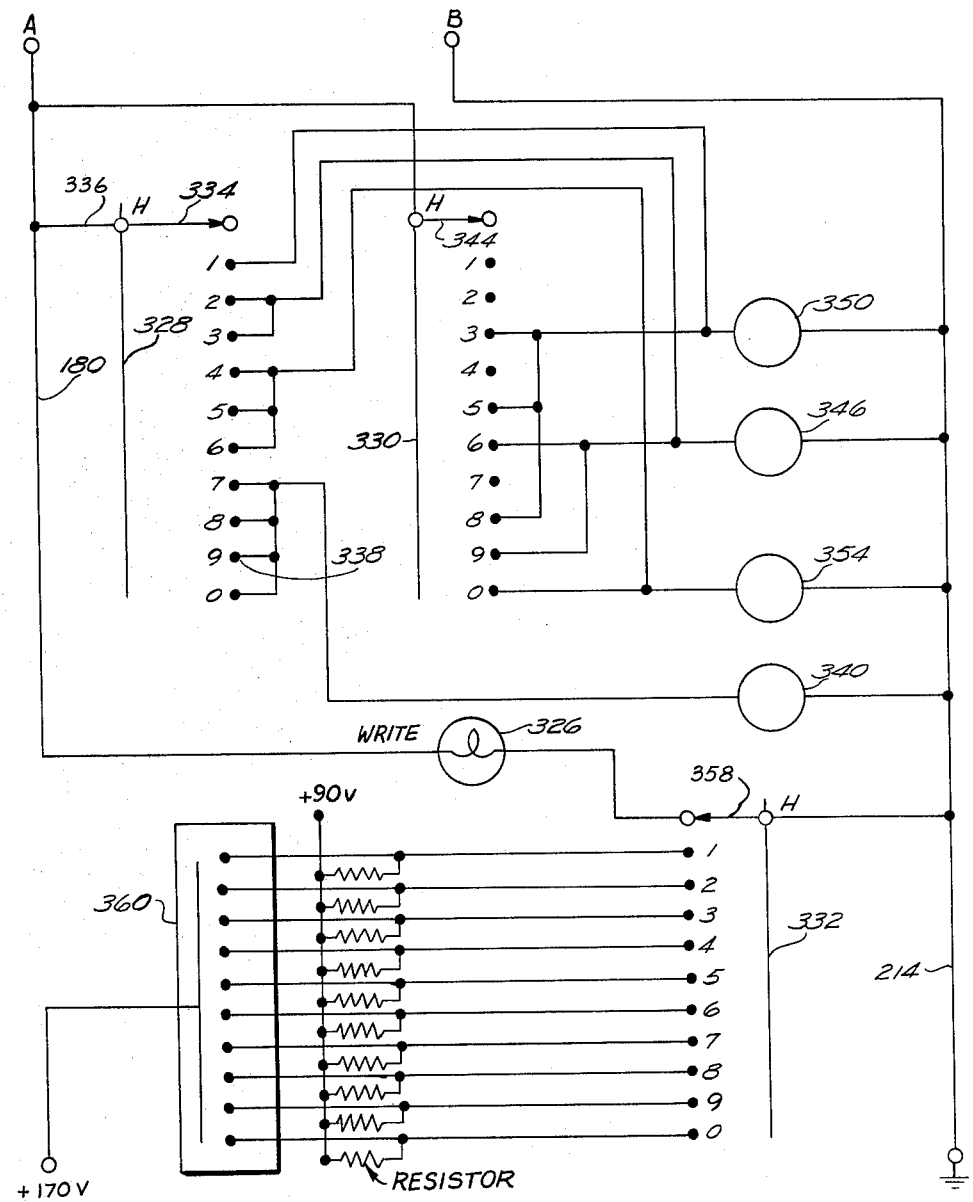
Figure 15:
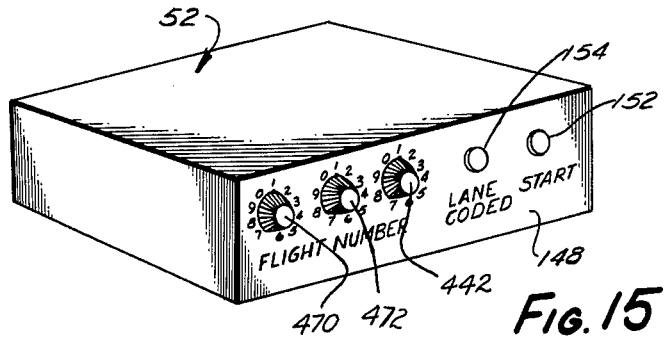
Figure 16:
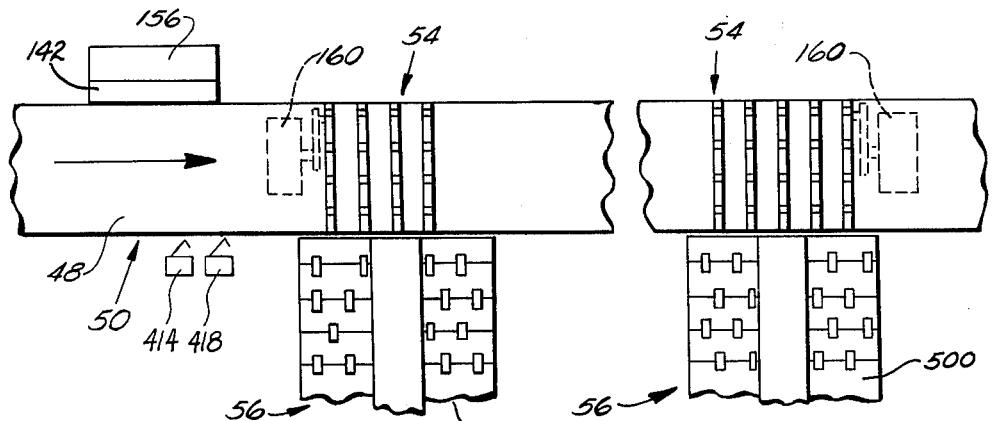
Figure 23:
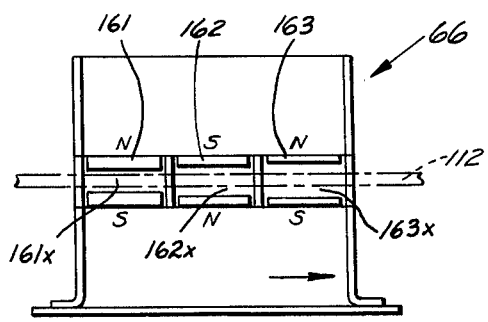
Figure 17:
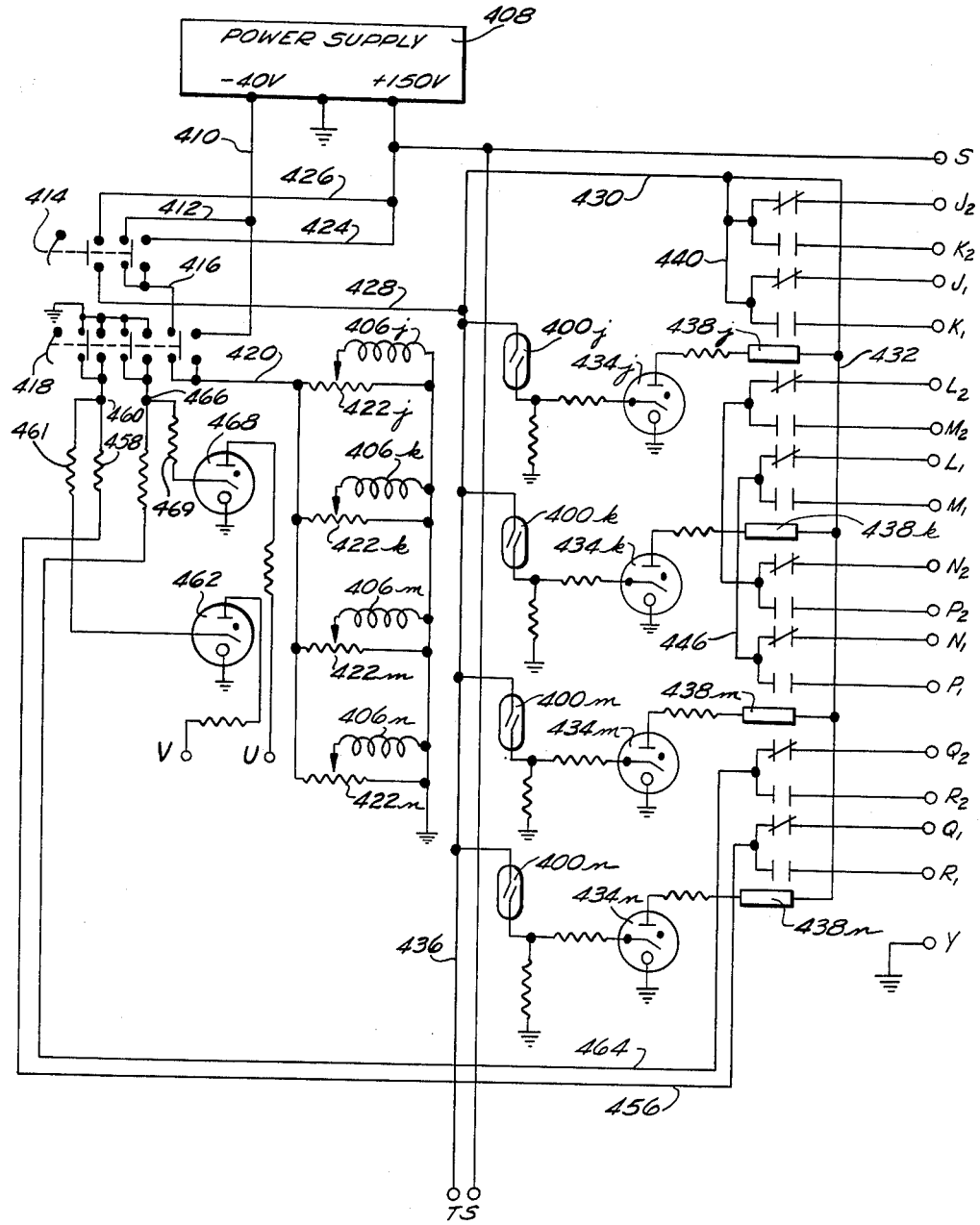
Figure 18:
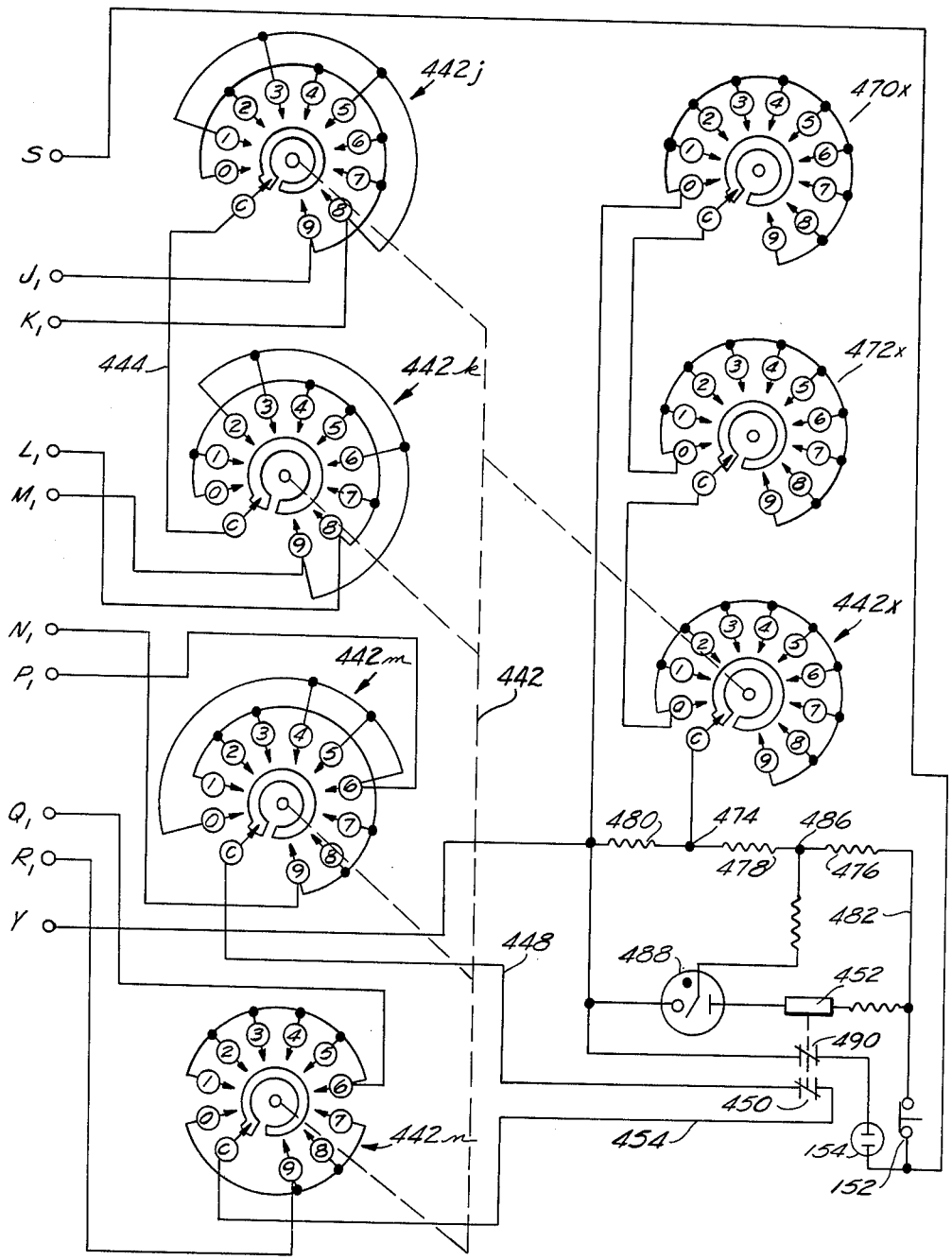
Figure 21:
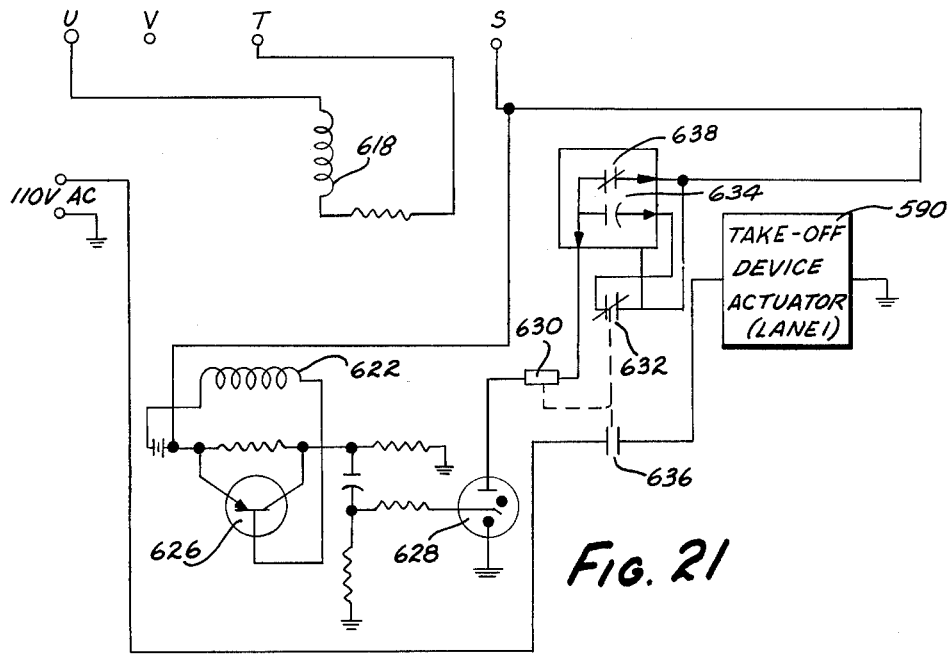
Figure 22:
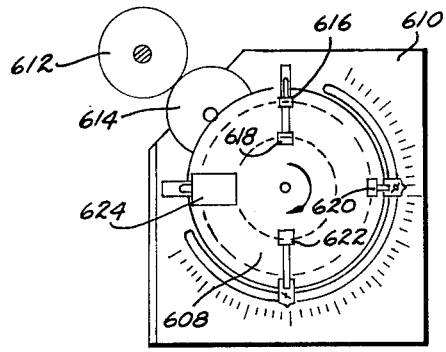
Figure 19:
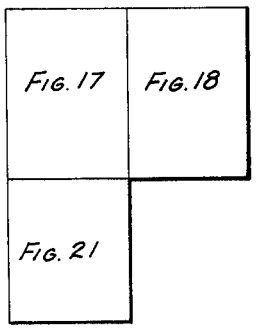
Figure 26:
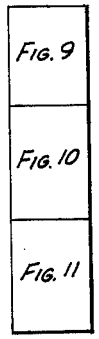
Figure 27:
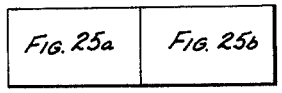
Figure 20:
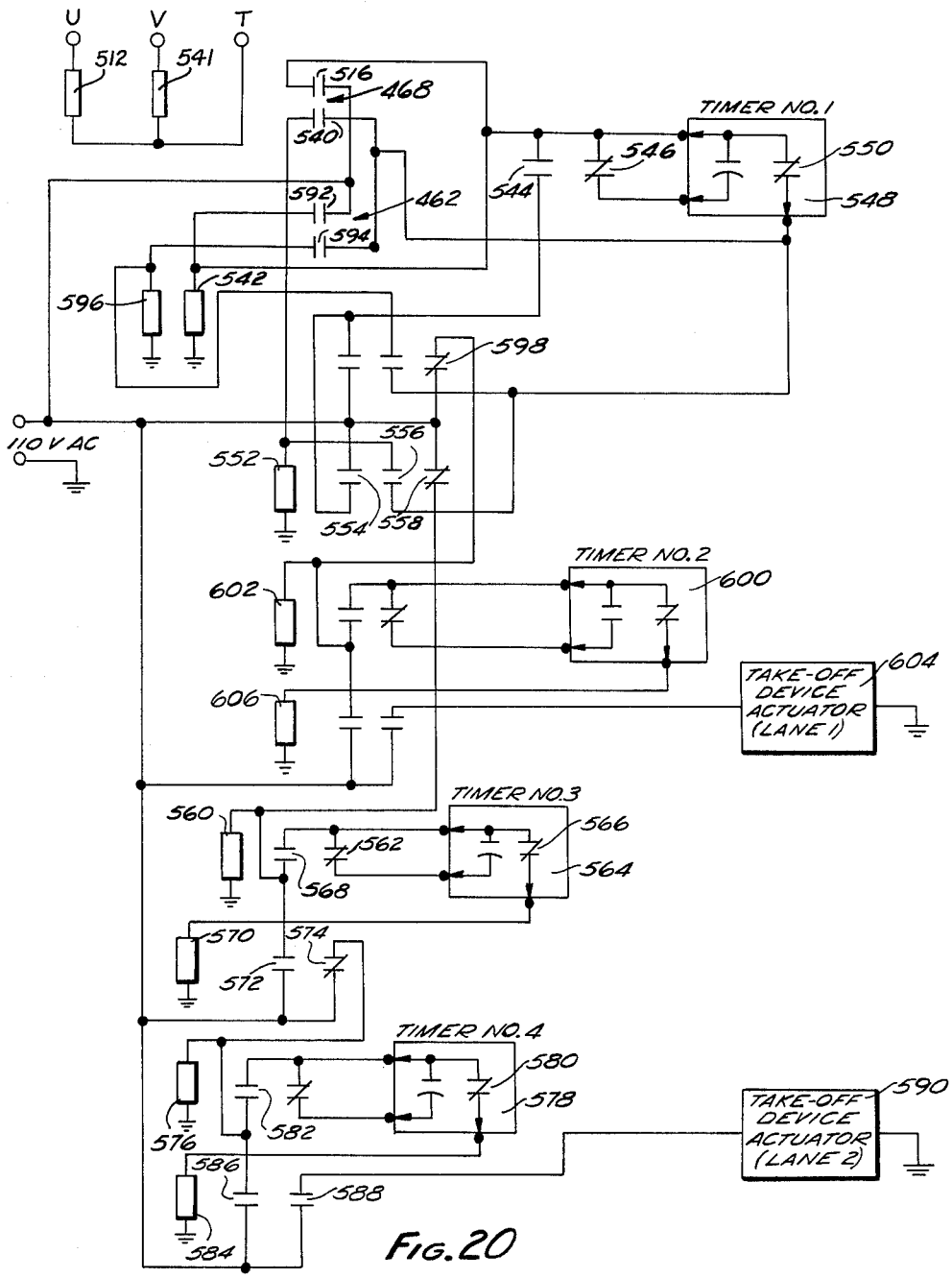
Figure 25B:
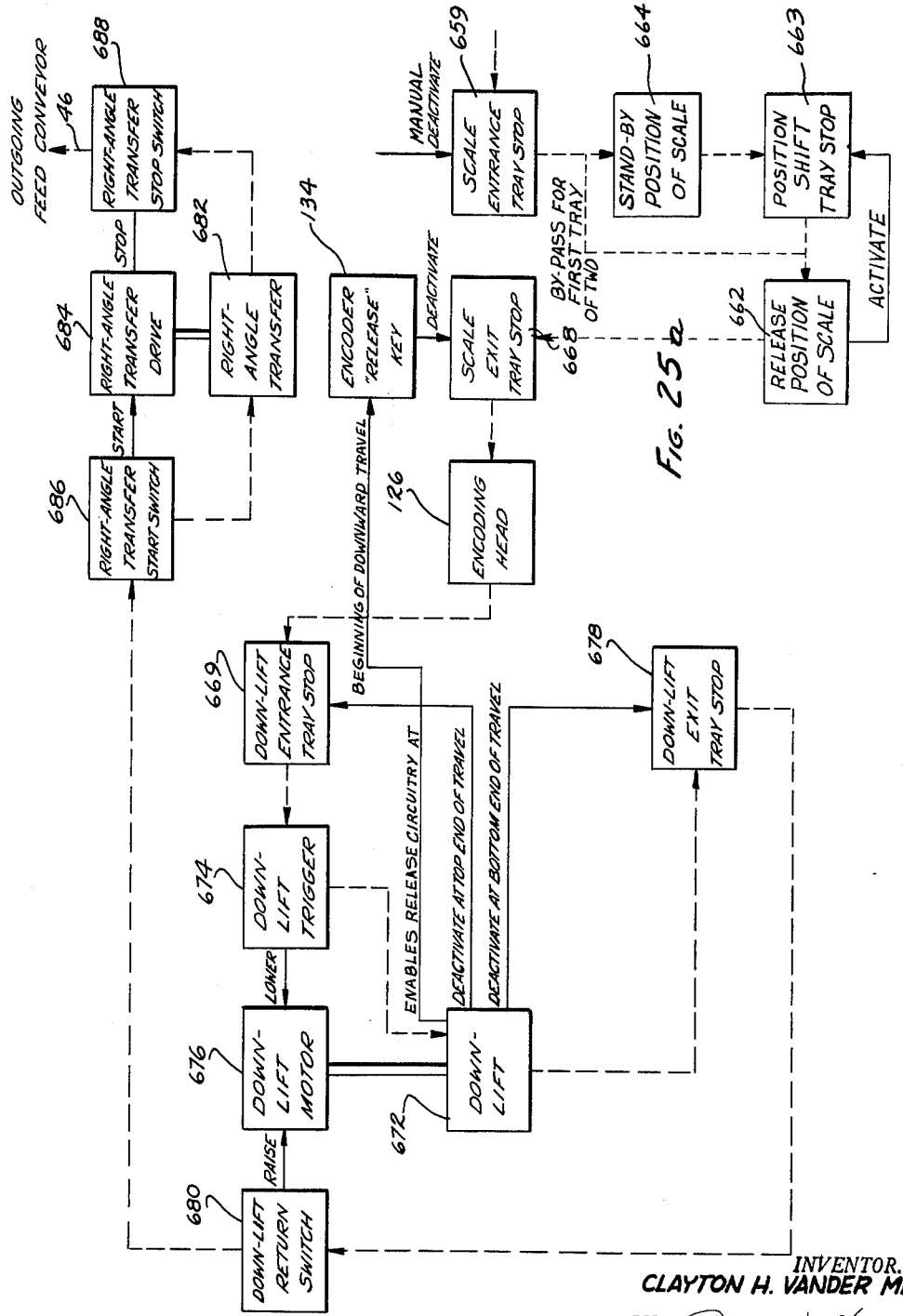
Figure 25:
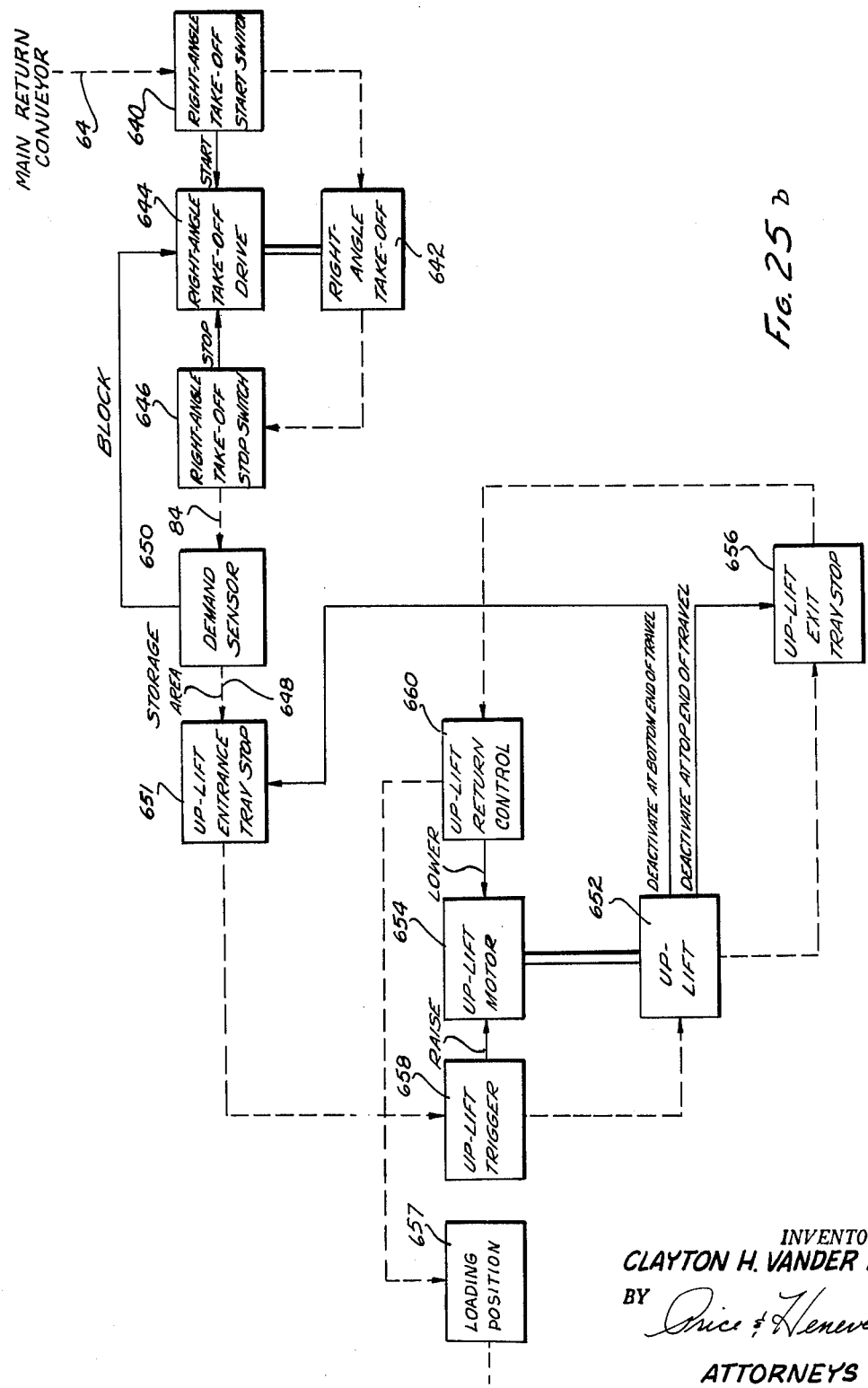

These and other objects of this invention will become apparent from a perusal of the following specification, taken in connection with the accompanying drawings in which:

FIG. 1 is a schematic layout diagram of the system of this invention;
FIG. 2 is a schematic representation of the basic physical organization of the "flowing storage" system;
FIG. 3 is a perspective view of a tray which may be used in the system of this invention;
FIG. 4 is a schematic layout diagram of the ticket counter portion of the system;
FIG. 5 is a perspective view of the encoder console;
FIG. 6 is a cutaway perspective view of the encoder head;
FIG. 7 is a vertical section taken along line VII—VII of FIG. 6;
FIG. 8 is an encoding chart;
FIGS. 9, 10 and 11 constitute a circuit diagram of the encoder;
FIG. 12 is a perspective view of a decoder head;
FIG. 13 is a transverse vertical section of a decoder module along line XIII—XIII of FIG. 12;
FIG. 14 is a vertical longitudinal section of a decoder module along the line XIV—XIV of FIG. 13;
FIG. 15 is a perspective view of a preselector console;
FIG. 16 is an enlarged schematic view showing the physical layout of the actuator portion of the system;
FIG. 17 is a circuit diagram of the decoder;
FIG. 18 is a circuit diagram of the preselector;
FIG. 19 is a block diagram showing how FIGS. 17, 18, 20 and 21 fit together;
FIG. 20 is a circuit diagram of a delay type of comparator-actuator unit;
FIG. 21 is a circuit diagram of a rotary type of comparator-actuator unit;
FIG. 22 is a front elevation of a magnetic rotary memory device as used in the circuit of FIG. 21;
FIG. 23 is a front elevation of the eraser head;
FIG. 24 is a flux graph of the eraser unit;
FIG. 25a is a block diagram of a flow control system for the outgoing side of the ticket counter;
FIG. 25b is a like block diagram for the incoming side of the ticket counter;
FIG. 26 is a block diagram showing the manner in which FIGS. 9, 10 and 11 fit together;
FIG. 27 is a block diagram showing how FIGS. 25a and 25b fit together;
FIG. 28 is a schematic view of the tray spacing mechanism; and
FIG. 29 is a schematic view of a decoder module illustrating its sequence of operation.

Basic concepts

**1.1—"*Flowing Storage*".**—Basically, the invention in its broadest aspect is concerned with a conveyor system having an originating station, a recirculating loop or "flowing storage" section, and a destination station. Traveling over this conveyor system are objects on which various destination codes have been impressed. The destination station can be made receptive to objects bearing a certain code from time to time, and to objects bearing other codes at other times. Objects fed into the system at the originating station at times when the destination station is not ready to receive them are periodically recirculated through the "flowing storage" section until such time as the destination station becomes ready to receive them.

**1.2—*Closed-loop conveyor*.**—The particular embodiment of the invention shown in this application embodies the concept of a closed-loop conveyor forming a primary loop from an originating station to a destination station and back to the originating station, a recirculating loop being interposed in the portion of the primary loop lying between the originating station and the destination stations. Coded objects are adapted to circulate on the conveyor system and the destination stations are associated with selectively codable paths so that each destination station can be made receptive from time to time to articles bearing selected codes.

**1.3—*Free-cycling codable containers*.**—This invention teaches the use on a closed-loop conveyor of free-cycling, article-carrying containers which are not in any way attached to the conveyor and can be placed on and removed from the conveyor at will. These containers carry a plurality of code-registering members which can be periodically encoded, decoded, and erased, and which are positioned one behind the other in a direction parallel to the direction of movement of the container while it passes through the encoding, decoding, or erasing means.

**1.4—*Basic control structure*.**—The basic electrical control structure of this invention consists of an encoding or writing unit, a decoding unit sometimes referred to as a reading or sensing unit, and an erasing unit, coupled with automatic routing means for routing coded objects along a conveyor system in accordance with the code demanded by various branches of the conveyor system, and with flow control means to assure proper spacing of the objects on the conveyor and to assure a continuous supply of objects at the conveyor's originating station.

**1.51—*Encoder*.**—The encoder of this invention consists basically of a keyboard-operated unit which presets an electric circuit so as to momentarily energize predetermined ones of a plurality of magnetizing current sources at the exact moment when an object to be coded is precisely in a predetermined position with respect to the encoding mechanism. In a preferred embodiment of the invention, special circuitry is provided so as to enable the keyboard to be of the ten-key type. This may be accomplished by an encoding system using a separate binary expression of each digit of a decimal code number. The binary system employed may be such that any digit of a decimal number can be expressed in the binary system by the energization of not more than two electrical circuits.

**1.52—*Automatic spacing*.**—This invention teaches the use of a spacing device which automatically provides a minimum spacing between successive objects conveyed on a conveyor prior to the passage of such objects through a code sensing device. The spacing is accomplished by conveying the objects first over a conveyor section driven at a first predetermined speed and immediately thereafter over a second conveyor section driven at a much greater speed. The conveyor is so constructed that an object traveling along it is accelerated almost instantly to the speed of the second conveyor portion as soon as its leading edge touches the second conveyor portion. During the interval of time between the moment at which the leading edge of the first object touches the second portion of the conveyor and the time at which the leading edge of the next following object touches the second portion of the conveyor, the first object moves faster than the next following object and thus becomes spaced therefrom. The amount of spacing can be controlled by varying the relative speed of the second portion of the conveyor with respect to the first portion thereof.

**1.53—*Decoder*.**—This invention provides a novel decoding circuit for decoding a signal impressed on a moving object, the components of the signal being positioned in sequence along a line parallel to the direction of movement of the object. More specifically, in the circuit of this invention, sensing elements are provided in the decoding unit which can respond instantaneously to the passage of a signal-bearing element; and the decoding circuit is accurately actuated only during a fraction of the minute time interval during which the object is in exact register with the decoding device by actuating the decoding circuit only during the time interval of movement of the contacts of a single switch between their two operative positions. This permits accurate decoding of objects traveling at speeds not heretofore possible.

**1.54—*Automatic switching lockout*.**—Because it is conceivable, in a conveyor system of the type described, that coded objects may be conveyed past the decoding mechanism while the code for a particular destination station is in the process of being changed, the present invention provides circuitry by which the manipulation of any of the code setting controls at a destination station automatically deactivates the routing mechanism associated with that destination station until it is manually placed back into service. This is accomplished by providing an extra wiper on all code setting switches of a preselector, and connecting together all the contacts wiped by these wipers. The wipers are then connected into a circuit which is broken each time the wiper is between two contacts, i.e. each time any of the code setting switches is moved. Breaking of the wiper circuit can then be made to cause deactivation of the takeoff device associated therewith. In this manner, misdirection of an object is prevented should the object pass the decoding mechanism at a time when one of the selector switches on a preselector has been set to a new code but the others have not yet been moved.

**1.55—*Selective take-off*.**—Selective take-off means are provided by this invention to remove coded objects from a conveyor at a plurality of distinct locations while using only a single decoding mechanism for sensing the code on the conveyed object. This function is achieved by providing one or more "memory circuits" associated with one or more of the take-off mechanisms. The common feature of the circuits, of which several embodiments are shown and described herein, is that they enable the decoding mechanism to sense the code of a coded object traveling along the conveyor before the routing of the immediately preceding object has been completed. The memory circuits shown herein are the delay type and, rotary type, respectively. The delay type of memory circuit causes the object to be ejected a predetermined time after its code has been sensed. The rotary type of memory circuit causes the object to be ejected after it has traveled a predetermined distance from the point of sensing.

**1.56—*Eraser*.**—In accordance with this invention, an eraser is positioned adjacent the return portion of a closed loop conveyor to erase the magnetic code markings impressed on the longitudinal flanges of reusable containers traveling along the conveyor loop. The eraser of this invention is adapted to embrace the flange containing the magnetized elements of the container and to subject them during their motion to an alternating flux field of gradually decreasing intensity. This may be accomplished by providing a series of oppositely polarized permanent magnets embracing the path of the flange and having progressively greater air gaps.

1.57—*Flow control.*—Flow control means according to this invention for assuring a steady flow and supply of containers at the originating station of a conveyor system of the type described herein may include a reserve storage area with automatic demand control means which, when the reserve storage area becomes depleted, route incoming containers into the reserve storage area as they become available; a standby storage area in which a few containers are constantly stored in readiness for immediate use, and which is replenished as necessary from the reserve storage area; a loading station where the containers are loaded and which receives a new container automatically as soon as a loaded container is dispatched therefrom; an encoding unit; gate means to prevent a next following loaded container from entering the encoding unit and to prevent the keyboard of the encoding unit from being actuated, while a loaded container is progressing through the encoding unit; and gate means for preventing entry of a loaded container into the encoder unit unless there is sufficient clearance beyond the encoder unit to permit the container to exist from the encoding unit without delay. In the particular embodiment described, the ticket counter area at which the flow control system is located is at a different level than the main portion of the conveyor system, and lifts are consequently provided to raise the containers from the reserve storage area to the standby storage area and to lower the loaded containers from the encoding unit back down to the main portion of the conveyor system. For safety reasons, these lifts may be so programmed that they come to rest only in their uppermost positions.

*Structural description*

2.1—*"Flowing Storage" section.*—FIG. 2 shows in schematic form the layout of the basic concept of the "flowing storage" conveyor system of this invention. Coded objects adapted to travel over the conveyor system 40 enter the conveyor system at the outgoing end 42 of the originating station 44 and are conveyed by a feed conveyor 46 onto the main transport conveyor 48. The main conveyor 48 leads past a decoding device 50. If the code on the object being conveyed is the same as that for which the decoding device 50 is set by the preselector 52, the take-off device 54 will cause the object to be diverted onto the branch conveyor 56 which conveys it to the destination station 58. If the code sensed by the decoding device 50 is different from that set up by the preselector 52, the take-off device 54 will not operate and the object will be conveyed into the recirculating loop 60 from which it is eventually discharged back onto the main conveyor 48 through the traffic control gate 62 which prevents collisions between objects entering the main conveyor 48 from the feed conveyor 46 and those entering the main conveyor 48 from the recirculating loop 60. If the objects are reusable containers, those that have reached the destination station 58 may be conveyed over a return conveyor 64 past the eraser 66 back to the incoming end 68 of the originating station 44.

2.2—*General layout.*—A typical embodiment utilizing the concepts of this invention is diagrammatically shown in FIG. 1. FIG. 1 schematically depicts the conveyor system according to this invention as it would be utilized in handling baggage at an airline terminal. Baggage destined for outgoing flights would be received at the ticket counter 72 which forms part of the originating station 44. The baggage is then placed by the ticket agent onto a tray such as shown in FIG. 3 which is waiting on the scale 74. After the baggage has been weighed and the flight number for which it is destined has been set up on the keyboard of encoder 76, the tray is released for travel through the encoder 76 and over feed conveyor 46 onto the main conveyor 48. Similar scales 74, encoders 76 and feed conveyors 46 are provided at the other positions of the ticket counter 72. Traffic controllers 62 are provided to prevent collisions between baggage-carrying trays entering the main conveyor 48 from different feed conveyors 46. Baggage traveling along the main conveyor 48 eventually reaches the decoding units 50. Each of the decoding units 50 controls one or more of the take-off devices 54 which divert baggage onto the branch conveyors 56. The specific code which will cause actuation of a given one of take-off devices 54 can be set up at will on the preselector 52 associated with that particular take-off device and normally located at the destination station 58 to which the branch conveyor 56 associated with the particular take-off device 54 leads. In the example discussed herein, the destination stations 58 would be located at the loading dock 78 at which the airplanes 80 are parked, each destination station 58 being equipped for the unloading of baggage destined for the airplane 80 associated therewith. When the baggage has been unloaded from a baggage carrying tray, the empty tray can be automatically or manually released onto the return conveyor 64. As the trays travel along the return conveyor 64, they pass through the eraser 66 where their destination code is erased. Switches 82 are provided to route the empty trays into one of the reserve storage areas 84 in accordance with the demand for empty trays as determined by suitable flow control devices.

Any baggage carrying tray which has not been diverted by any of the take-off devices 54 enters the recirculating loop 60. Recirculation of the baggage which has entered the recirculating loop 60 can take place continuously, or a gate 86 may be provided to periodically release all baggage stored in the recirculating loop 60 for reprocessing through the decoding devices 50.

Although the originating stations have so far all been described as being at the ticket counter 72, it will be understood that an originating station could also be located, for example, in the baggage room 88 where incoming baggage is delivered to deplaning passengers at the baggage counter 90, and continuing baggage is placed onto a tray at the loading station 92 to be transferred to the outgoing flight for which it is destined, via the feed conveyor 94 leading to the main conveyor 48.

2.3—*Tray.*—FIG. 3 shows at 100 a preferred embodiment of container or tray which is particularly adapted for use in a conveyor system of the type described. The tray 100 is preferably formed of wood or other wear-resistant, nonmagnetic material to avoid interference with the operation of the code devices, and is adapted to freely float on the rollers 102 of a conveyor 104. The tray 100 has a bottom 106, side walls 108, and end walls 110, which together form the baggage-receiving container. Side flanges 112 and end flanges 114 are provided around the sides and ends of the tray 100 to serve as bumpers. In addition, the side flange 112 visible in FIG. 3 carries a series of magnetizable slugs 116a through 116n. As the tray 100 travels along the conveyor 104, the flange 112 carrying the slugs 116 passes through the air gap 120 of the magnetic circuits 118 in the box 122 which may be the encoding head, decoding head or eraser head.

2.4—*Basic control layout.*—The basic control components of the invention are shown in FIGS. 5, 6, 12, 15, 16, 23, 25 and 29. FIGS. 5 and 6 show the encoding mechanism which is operated from a keyboard 132 (FIG. 5) and imparts a magnetic code to the slugs 116a through 116n of the tray 100 through an encoding head 126 (FIG. 6). The console 124 preferably contains an indicator 128 on which the flight number to be encoded is visually displayed; a row of signal lights 130 which indicate the condition of the apparatus; a ten-button keyboard 132 on which the flight number can be set up; a "release" button 134 by which a tray 100 can be released into the encoding head 126, and a "cancel" button 184 to cancel an entry on the keyboard 132.

The flight number set up on the keyboard 132 is translated into a binary or trinary magnetic code by an encoding apparatus which sends a strong, sharp current impulse through the coils 136 of electromagnets 138 at the precise instant when each of the slugs 116 of the tray 100 is directly between the pole pieces of one of the electromagnets 138.

The magnetic code impressed on the slugs 116 of the tray 100 may be sensed for routing purposes by a sensing or decoding head 142 (FIG. 12), which may be substantially identical in construction to the encoding head 126 except that magnetic shields 140 may be provided in the sensing head to avoid interference between adjacent modules. The sensing head 142 has as many modules 421 (FIG. 29) containing magnetic sensing circuits 144 as there are encoding magnets 138 in the encoding head 126. Like the encoding head 126, the sensing head 142 has a gap 146 through which the flange of the tray is adapted to pass for sensing purposes.

The code sensed by the sensing head 142 is electronically compared to a preselected code set up on a preselector panel 148 which forms part of the preselector unit generally designated as 52 in FIG. 1. One panel 148 is provided for each branch conveyor or lane 56 (FIG. 1). Each preselector panel 148 contains a series of switches 470, 472, 442 on which the decimal digits of the flight number to be loaded at the station 58 associated with the particular preselector 52 can be set up. A start button 152 is provided to energize the preselector 52 after a flight number has been set up on the switches 442, 470, 472, and a "lane coded" pilot light 154 indicates that the lane is in use.

The information sensed by the sensing head 142 is then fed to a decoder-comparator 156 (FIG. 16) which cooperates with the preselector units 52 to actuate the diverter motor 160 at the appropriate one of the take-off devices 54 at the exact moment at which a tray moving on the main conveyor 48 and destined for one of the branch conveyors 56 passes thereover.

After a tray 100 has reached its destination, it is returned to its originating station over the return conveyor 64 (FIG. 1) on which it travels through the eraser 66. The eraser 66 may, for example, consist of permanent magnets 161, 162, 163 (FIG. 23) of successively opposed polarity and successively diminishing strength through whose air gaps the flange 112 of a tray 100 is adapted to travel in the direction of the arrow. Of course, other erasing devices, such as a high-frequency magnetic field (not shown) may be used.

In order to assure a uniform flow of trays 100 in accordance with the needs of an originating station 74, and to assure adequate spacing of the trays along the main conveyor 48 for accurate sensing, flow control means such as hereinafter described in Section 2.57, and automatic spacing means such as hereinafter described in Section 2.52, may have to be provided.

2.51.11—*Encoder; physical layout.*—The encoding device according to this invention consists of three basic components which may be mounted remotely from one another if desirable. The three basic components are the encoder console 124 (FIG. 5), the encoder circuit (FIGS. 9, 10 and 11), and the encoding head 126 (FIGS. 6 and 7). In the following description, it should be understood that the encoder circuit described is the circuit associated with only one of the decimal digits of the flight number (the units digit in this description), which decimal digit is expressed by four binary digits. The circuitry associated with the tens and hundreds digits of the flight number is merely a repetition of the circuitry shown in FIGS. 9, 10 and 11 and has been omitted for clarity.

2.51.12—*Encoder; mathematical principle.*—The mathematical principle underlying the code circuitry of this invention is, in the preferred embodiment described, based on the separate translation of each digit of the decimal flight number into a binary code impressed on four of the magnetizable slugs 116 in the form of either the presence or absence of magnetic flux. Although it will be understood that it is immaterial whether the presence or the absence of a signal is made to signify the binary digit 1, the preferred embodiment uses the presence of magnetic flux as the figure 1 of the binary system. Of course, a trinary system could be used by coding not only by the presence and absence of flux, but also by polarity of flux. The binary system used in the preferred embodiment of this invention differs somewhat from the ordinary binary system and is shown in FIG. 8. It will be seen that the digits of the binary system represent the decimal figures 7, 4, 2 and 1 instead of the usual 8, 4, 2 and 1. This system permits the expression of any decimal digit of the flight number by the energization of not more than two encoding elements 138. The advantages of this concept are explained in Section 2.51.22. The reason for expressing each digit of the flight number separately in binary units, rather than expressing the entire flight number in binary units, is the great simplificiation of the electronic components made possible thereby. In FIG. 8, the suffix letters of the twelve slugs 116 of tray 100 are shown in the top line. Each blank rectangle 166 means that the slug listed at the head of the column is energized in the expression of the number shown to the left of the black box, whereas a white box 168 indicates that the particular slug is demagnetized in the expression of that number.

2.51.21—*Encoder; head structure.*—Referring now to FIG. 6, it will be seen that the encoding head 126 contains twelve electromagnets 138a through 138n corresponding to the twelve magnetizable slugs 116 on tray 100. Each of the electromagnets 138a through 138n is equipped with its own magnetizing coil 136a through 136n. An appropriate guide device 670 (FIG. 4) is provided to accurately guide the flange 122 of the tray 100 through the air gaps of electromagnets 138. The encoding circuit is preset as hereinafter described, and the appropriate magnetizing pulses through the windings 136 are triggered, when the tray is in alignment with the head 126, by the encoder entry trigger switch 306. Provisions are made by any appropriate means such as the power driven wheel of the guide device 670 to drive the tray 100 past the encoding head 126.

2.51.22—*Encoder; electronic structure.*—The functioning of the encoder itself can best be understood from an examination of FIGS. 9, 10 and 11. In FIG. 10, the keyboard of the encoder console 124 is once again shown at 132. Each push button of keyboard 132 is in effect a single-pole double-throw switch. In the rest position of the buttons of keyboard 132, the current path which can be traced from the main 180 of power supply A-B through section 182 of "cancel" button 184 (FIG. 5) and the normally closed contacts 186 of relay 188 dead-ends in bus 190. As soon as any of the push buttons of keyboard 132, such as push button 192, is depressed, however, the current path from bus 190 continues through tap-off 194, push button 192, and tap-off 196 to bus 198. From bus 198, current continues to flow through wire C and junctions 200 and 202 (FIG. 9) to arm 204 of a selector relay 206. Arm 204 is so arranged that it closes a circuit to wire 208 when selector relay 206 is "at home" (i.e. in its rest position). From wire 208, a current path is therefore established through wire 210 and relay coil 212 to the other bus 214 of the power supply A-B. Relay 212 now becomes energized and locks itself in by closing its normally open contacts 216. At the same time, the energization of relay 212 closes its normally open contacts 218 and a current path is established from wire 210 through wire 220 and the normally closed contacts 222 of relay 224. From there, current flows through wire D to the "home" contact H of gang 226 of selector relay 206, and through selector arm 228 and the (now closed) normally open contacts 218 of relay 212 to the interrupter contacts 230 and stepping coil of relay 206. The other end of the coil 206 is connected to the power bus 214.

Due to the action of interrupter 230, selector arm 228 now starts to travel along the contacts of gang 226, each of which is connected to bus 198 through one of the push buttons of keyboard 132, until it reaches a contact which is not connected to bus 198. The only such contact it finds is contact 232 which is dead because push button 192 is depressed. Selector arm 228 now remains at contact 232. It should be understood that selector relay 206 is of the fast-acting type and reaches contact 232 in less than half a second. When push button 192 is now released, bus 198 is cut off from bus 190 and the current to gang 226 of selector relay 206 is cut off. At the same time, the de-energization of bus 198 deprives relay 212 of current, and relay 212 drops out, opening contacts 216.

While the previously described process was going on, normally closed contacts 234 of relay 212 were open. As soon as selector arm 228 left the "home" position, switch arm 204 opened and switch arm 236 closed. Therefore, when relay 212 drops out, bus 198 becomes disconnected from wire 210 and instead becomes connected to wire 238. It will be readily seen that if push button 240 is now depressed, relay 242 will become energized, closing contacts 244 and 246, and opening contact 248. This causes selector relay 250 to become energized, and selector arm 252 steps along the contacts of gang 254 and comes to rest on contact 256. Release of push button 240 causes wire 238 to become connected to wire 258 through contact arm 260. If push button 262 is now depressed, relay 264 is energized, closing contacts 266 and 268 and opening contacts 270. Selector arm 272 of selector relay 274 thereupon steps to contact 276, and the flight number "749" has now been fully set up. Release of push button 262 causes relay 264 to drop out, and contacts 270, upon reclosing, throw power through switch arm 278 and wire 280 onto relay 188. Energization of relay 188 causes contacts 186 to open, thus disabling the keyboard, and contacts 282 (FIG. 10) to close, thus lighting the "ready" light 284 if limit switches 286 and 288 are closed, as they normally are when a tray is in the release position 662 of scale 690 (FIG. 4) and lift 672 is in position to receive a tray. With the encoder in this condition, it is now possible to release a tray into the encoder by pressing "release" button 134 on console 124. Section 290 (FIG. 9) of "release" button 134 disables the "cancel" button until relay 296 (FIG. 10) has had time to open its contacts 314 (FIG. 9) for the same purpose. Section 294 (FIG. 10) operates the gate mechanism 292 which starts a tray 100 on its way.

The gate 292 is so arranged in a well-known manner as to re-close immediately after the tray clears it, as e.g. by actuation of a limit switch 692, and not to release another tray until wire 304 is de-energized and then re-energized.

At the same time, section 294 of release button 134 energizes relay 296 through normally closed contacts 298 and "ready" switch 300. Energization of relay 296 causes contacts 298 to open, and contacts 302 to close instead. This causes relay 296 to lock itself in until "ready" switch 300 is opened by the return of lift 672 (FIG. 4) to its tray-receiving position. While relay 296 is energized, contacts 298 (FIG. 10) extinguish the "ready" light 284 and instead contact 308 closes to light up the "wait" light 310. In this condition, all controls are "dead," and no further release can take place until lift 672 is ready to accept another tray.

It will be seen that in the circuit described, a code once set up will not change unless it is purposely cancelled. This cancellation is accomplished by pressing the "cancel" button 184 (FIG. 5), whose two sections are shown in FIG. 10 at 182 and in FIG. 9 at 312. Section 312 of the "cancel" button 184 is connected to bus 180 through the normally closed contacts 314 of relay 296. Consequently, actuation of the "cancel" button while relay 296 is energized (i.e. when a tray is passing through the encoder) has no effect. At other times, however, section 312 closes a circuit energizing relay 224. This causes contacts 316, 318 and 320 to close and contacts 222, 322 and 324 to open. As a result, relays 212, 242 and 264 are simultaneously tripped, and selector arms 228, 252 and 272 return to their "home" position. (In this condition, bus 198 is energized through contacts 316 and 216.) A "write" light 326 is so connected to the "home" contact of the indicator gang 332 (FIG. 11) of selector relay 274 (discussed hereinafter) that it is illuminated whenever relay 274 is in the "home" position, i.e. until a complete three-digit flight number has been written.

Referring now to FIG. 11, it will be seen that selector relay 274 has three additional gangs 328, 330 and 332. (The other two selector relays also have three additional gangs which are connected in a like manner and therefore not shown herein.) Selector arm 334 of gang 328 is connected to the power main 180 by wire 336. When selector relay 274 stops in the position of contact 276 (FIG. 10), selector arm 334 stops at contact 338. In this position, it closes the circuit of relay 340, which in turn closes the normally open contacts 342 (FIG. 9) which enable encoding coil 136n to function. In a like manner, selector arm 344 of gang 330 energizes relay 346, which in turn closes contact 348, enabling the functioning of encoding coil 136k. Referring to FIG. 8, it will be seen that energization of coils 136n and 136k will result in the encoding of the digit "9" of the flight number "749." It will be readily seen that in appropriate cases, relay 350 enables the energization of coil 136j through contact 352, and that relay 354 enables the energization of coil 136m through contacts 356.

Switch arm 358 of gang 332 of selector relay 274 lights the "write" lamp 326 in its "home" position, and lights the appropriate figure on indicator tube 360, which forms part of the display 128 on the encoding console (FIG. 5), by grounding the appropriate cathode.

In the example chosen, the indicator tube 360 will show the figure "9," and contacts 348 and 342 will be closed. Transformer 362 meanwhile charges capacitor 364 through rectifiers 366. When the tray 100 is perfectly aligned with encoding head 126, the leading bumper 114 of tray 100 trips limit switch 306. This disconnects the primary of transformer 362 from the power line and simultaneously short-circuits capacitor 364 across busses 368 and 370 (which are common to all twelve coils 136, even though only four coils 136 are shown). This in turn causes the capacitor 364 to discharge i.a. through coils 136k and 136n, these coils being in the circuit because contacts 348 and 342 are closed.

It will be noted that because of the choice of binary designations described in Section 2.51.12, only two gangs of each selector relay are necessary to set up any decimal digit on relays 340, 346, 350 and 354, or their equivalents for the tens and hundreds digits. Also, the energy of capacitor 364 is distributed among no less than three nor more than six coils 136 for any flight number from 000 to 999. This permits keeping the intensity of the individual magnetic impulses within predetermined limits in spite of the parallel connection of coils 136.

Because the tripping of limit switch 306 has disconnected the primary of transformer 362, capacitor 364 cannot recharge until tray 100 has safely passed out of the range of encoding head 126 and has released limit switch 306 to its lower position.

Circuitry like that of FIG. 11 is duplicated for the hundreds and tens encoding apparatus associated with selector relays 206 and 250 respectively. However, this circuitry is not shown herein so as not to unnecessarily complicate the drawings.

2.52—*Spacer.*—FIG. 28 schematically shows a section of conveyor in which the proper minimum spacing of trays is accomplished so that they will enter the decoding section at sufficiently long intervals to permit proper functioning of the decoding apparatus. Trays 100 enter FIG. 28 from the right and travel to the left. The right-hand portion of the conveyor 104 is equipped with rollers 380 powered by a belt 382. The last roller 384 in the chain of rollers 380 may be coated with rubber or other gripping material to prevent slippage of a tray 100 thereon. Continuing in the direction of movement, a series of idler rollers 386 are next provided for a distance slightly less than the length of a tray 100. Following the idler roller section, there is a section of fast-moving rollers 388, whose first roller 390 may be coated with an anti-slip compound. The high-speed rollers 388 are driven by an appropriate belt 392. If two trays arrive at the device of FIG. 28 together, the first tray 100 will eventually be gripped by roller 390 and will be suddenly accelerated to a speed considerably greater than that of the following tray 100. By the time the second tray 100 reaches roller 390 and is in turn accelerated, the first tray 100 has already traveled a considerable distance ahead of the second tray 100 and has thus become spaced therefrom. Thus, the device of FIG. 28 permits the maintenance of a predetermined minimum spacing between trays as they reach the decoding section of the system. The amount of spacing obtained can easily be adjusted by varying the relative speeds of the belts 392 and 382.

2.53.1—*Decoder; general layout.*—The decoding head used in the system of this invention is quite similar to the encoding head, except for shields 140, and consists of an array of magnetic cores 144 (FIG. 12) through whose gaps the flange 112 of tray 100 travels. As appears more clearly from FIGS. 13 and 14, the magnetic core 144 encloses a magnetic switch 400 in its magnetic circuit. The magnetic switch 400 is of well-known construction and comprises a pair of switch blades 402, 404 of magnetizable material mounted in a vacuum, which come together when they are subjected to the influence of a magnetic field of predetermined intensity. An electromagnetic coil 406 surrounds the magnetic switch 400 and is used to maintain a threshold field which is just insufficient to close the magnetic switch 400, and whose polarity can be adjusted to either aid or oppose the magnetic impulse induced in magnetic core 144 by the passage of a magnetized slug 116 of tray 100 through the gap of magnetic core 114.

It will be understood that instead of using magnetic switches 400, the windings 406 may be used to feed induced current impulses created by the passage of magnetized slugs 116 to well-known switching transistors arranged to close the electrical circuit between wire 436 and tubes 434 in the same manner as magnetic switches 400. This arrangement makes the maintenance of a threshold field unnecessary, but is somewhat more expensive.

2.53.2—*Decoder; operation.*—In FIG. 17, the coils 406 corresponding to the units digit of the flight number are shown at 406$j$, $k$, $m$ and $n$. When no tray is present in the decoding mechanism, a negative voltage of about 40 volts may be applied to the coils 406 from power supply 408 through wire 410, 412, entry switch 414, wire 416, exit switch 418, wire 420 and field calibrating potentiometer 422. In this condition, the coils 406 create magnetic fields opposed to the field produced by slugs 116 but far too weak to close the magnetic switches 400, and the magnetic switches 400 are all open.

As the tray 100 reaches the decoding head 142 bus 432 remains deenergized, because entry switch 414 is open, until tray 100 approaches a position of alignment therewith, i.e. until e.g. slug 116$k$ first enters module 421$k$ of decoding head 142 (FIG. 29). In the position marked A in FIG. 29, the tray 100 completes actuation of the entry switch 414 and thus supplies a 150 volt plate voltage to bus 432 through wires 428 and 430. Actuation of the entry switch 414 also causes wire 416 to become connected to a positive voltage of 150 volts through wire 424, instead of the negative 40 volt voltage from wire 412. This causes the coils 406 to subject all of the magnet switches 400 to a threshold magnetic field which is of the same polarity as that induced by slugs 116 and is just below the intensity necessary to close switches 400. As long as the magnetic switches 400 are open, the grids of the gas-filled cold-cathode tubes 434 remain grounded, and the tubes 434 cannot fire. However, in the example discussed here, the magnetic code "749" was impressed on the slugs 116 of tray 100, and consequently slugs 116$k$ and 116$n$ are magnetized, while slugs 116$j$ and 116$m$ are not (see FIG. 8). As slug 116$k$ now approaches core 144$k$ and reaches position B in FIG. 29, the magnetic flux in core 144$k$, aided by that of approaching slug 116$k$, begins to exceed the threshold for actuation of magnetic switch 400$k$, and switch 400$k$ begins to close. As slug 116$k$ reaches position C in FIG. 29, the contacts 402, 404 of switch 400$k$ touch, and tube 434$k$ fires. This causes plate relay 438$k$ to become energized, and its contacts complete their movement just before slug 116$k$ reaches position D in FIG. 29. At this point, tray 100 begins to trip exit switch 418. While slug 116$k$ travels from position D to position E in FIG. 29, the contacts of exit switch 418 travel between their rest position and their tripped position, and it is during this very small time interval that the comparing operation takes place, i.e. that tubes 462, 468 respond to energization of their control circuits as hereinafter explained. Thus, the distance AC represents the sensing operation and the distance DE the comparing operation of the decoder. The distance CD represents the time interval necessary for the electromechanical components of the decoder to respond.

In the example chosen, magnetic switches 400$k$ and 400$n$ close, while magnetic switches 400$j$ and 400$m$ remain open. Consequently, only tubes 434$k$ and 434$n$ fire and, because of their gas-filled characteristic, remain fired as long as plate voltage is present. As soon as slug 116$k$ reaches position D in FIG. 29, the contacts of switch 418 leave their rest position and thus cause wire 420 to be disconnected from wire 416. An instant later, when slug 116$k$ reaches position E and the contacts of exit switch 418 reach their tripped position, wire 420 becomes connected to wire 410, so that the coils 406 once again create a negative blocking field. This causes magnetic switches 400$k$ and 400$n$ to reopen and to remain open while the tray 100 continues to pass through the decoding head. The tubes 434$k$ and 434$n$ remain fired, however, and consequently, in this condition, relays 438$k$ and 438$n$ are energized, while relays 438$j$ and 438$m$ are not.

Each of the relays 438 has as many contact pairs as there are branch conveyors served by the particular decoding head involved. Two such contact pairs have been drawn in FIG. 17 for each of the relays 438, and the following description of the circuits denoted by the suffix "1" are equally applicable to the circuitry identified by the suffix "2."

Each contact pair of relays 438 has a normally closed contact and a normally open contact. In the example chosen, relay 438$j$ is de-energized after passage of the tray 100, and current from the positive 150 volt terminal of power supply 408 will flow from wire 430 through wire 440 and the normally closed contact of the lower contact pair of relay 438$j$ to wire $J_1$. Turning now to FIG. 18, wire $J_1$ can be traced to terminal "9" of gang 442$j$ of the "units" switch 442 of preselector 52 (FIG. 15). The circuit then continues through the common terminal of gang 442$j$ and wire 444 to the common terminal of gang 442$k$. From there, the circuit continues through terminal "9" of gang 442$k$ and wire $M_1$ to the lowermost normally open contact of relay 438$k$ (FIG. 17). Since relay 438$k$ is energized in this example, its normally open contacts will be closed, and the circuit continues through wire 446 and the normally closed contact of the lower contact pair of relay 438$m$ (which is de-energized) to wire $N_1$. Wire $N_1$ is connected to terminal "9" of gang 442$m$ of preselector switch 442 (FIG. 18), and the circuit continues through the center contact of gang 442$m$ and wire 448, normally closed contact 450 of relay 452, and wire 454 to the center contact of gang 442$n$ of switch 442. From terminal "9" of gang 442$n$, the circuit then continues through wire $R_1$ and the lowermost normally open contact of relay 438n (FIG. 17) which is energized in this example to wire 456. Although the circuit has been described here only with respect to the units digit of the flight number, it will be recognized that like circuitry for the tens and hundreds digits of the flight number can be connected into the circuit presently under discussion in series relationship between wires 430 and 440 (FIG. 17). In the example chosen, the code sensed on tray 100 corresponds to the code preset on preselector switch 442, and wire 456 is consequently at a potential of +150 volts. This potential appears across resistor 458, whose other side is connected to ground through exit switch 418.

As appears from the above discussion, the operation of relays 438 occurs as soon as entry switch 414 is tripped by the tray 100. Consequently, when exit switch 418 is tripped by tray 100 immediately thereafter, the positive 150 volt potential is already applied to resistor 458. When exit switch 418 is now tripped, its contacts are momentarily between their two extreme positions, and it is during this instant of time that resistor 458 is disconnected from ground. If positive potential is applied to resistor 458 at that instant, junction 460 will momentarily become positive, only to return to ground potential as soon as exit switch 418 has completed its travel. The momentary positive impulse at junction 460 is transmitted through resistor 461 to the grid of tube 462, for a purpose to be hereinafter described. In the example chosen, if the preselector switch associated with the circuitry designated by the suffix "2" is set for a digit other than "9," the circuit between wire 440 and wire 464 will be broken and no positive voltage will appear in wire 464. Consequently, junction 466 will not rise above ground potential during the tripping of exit switch 418, and no positive pulse will be transmitted to the grid of tube 468 through resistor 469. As soon as the tray 100 has cleared the decoding head 142, entry switch 414, and immediately thereafter exit switch 418, return to their normal positions. The return of entry switch 414 breaks the circuit between power supply 408 and wire 428 and removes positive potential from bus 432, thereby restoring tubes 434 and relays 438 to their de-energized condition.

2.54—*Automatic switching lock-out.*—Changing the setting of the switches of any preselector 52 while the system is in operation could easily result in a malfunction. For example, if it is desired to change the dials from "749" to "836," it is quite possible that a tray 100 would pass the decoding head 142 after the operator has turned the hundreds selector switch 470 to "8" but has not yet had time to set the tens selector switch 472 and the units selector switch 442 to the appropriate positions. In that event, the passing tray would be ejected from the recirculating loop if it carried the code "849."

To avoid such a malfunction, each of the preselector switches 470, 472, and 442 are equipped with an additional gang 470x, 472x, and 442x. All the contacts except the center contact on each of these gangs are connected together, and the gangs 470x, 472x, and 442x are connected in series with one another, as shown in FIG. 18. One side of this series circuit is connected to ground through wire Y, and the other is connected to junction 474 of a resistor chain consisting of resistors 476, 478, and 480. The right-hand end (in FIG. 18) of resistor 476 is connected to a 150 volt positive potential through wire 482, start button 152, and wire S. The resistors 476, 478 and 480 are so chosen that when resistor 480 is shorted out (as will be the case in any position of the selector switches), terminal 486 will be below the firing potential for the grid of tube 488. If any of the selector switches 470, 472, or 442 are now moved, the circuit which shorts out resistor 480 will be momentarily broken as the contact arm of the switch being moved travels from one fixed contact to the next. During that instant, resistor 480 is in the circuit between ground (wire Y) and junction 474, and the potential at junction 486 momentarily rises above the firing potential for the grid of tube 488. Tube 488 thereupon fires and because of its gas-filled characteristics, remains fired even after the potential at junction 486 drops back below the firing level. Firing of tube 488 causes relay 452 to energize and to open contacts 450 and 490. Contact 490 upon opening extinguishes lamp 154 to indicate that the branch conveyor associated with the preselector here described has been disconnected. At the same time, the opening of contact 450 breaks the circuit between wire 448 and 454 and prevents tube 462 (FIG. 17) from firing. Operation of the circuit cannot be restored until the start button 152 is depressed, cutting the plate supply for tube 488 and restoring relay 452 to its deenergized condition.

2.55—*Selective take-off; general.*—The selective take-off or ejection of the trays from the recirculating conveyor 70 can be physically accomplished by any desired type of well-known apparatus. In the present description, it has been assumed that the apparatus used is a motor-driven right-angle take-off device, and the following description is concerned merely with the proper timing of the impulse which actuates the take-off device so that the take-off device springs into operation at the exact moment when the proper tray is on it. A typical take-off section has been described hereinbefore in connection with FIG. 16.

2.54.11—*Selective take-off; delay type.*—If means are provided in the system to maintain the speed of conveyor 48 reasonably constant, the ejection of trays 100 onto the appropriate one of conveyors 500 or 506 (FIG. 16) can be accomplished by a fully electronic system such as that shown in FIG. 20. Assuming once again that the code on a tray 100 has caused energization of relay 512 so as to close its contacts 516 and 542, the tray 100 is to be ejected onto conveyor 500 in this example. In FIG. 20, the closing of contact 516 causes relay 542 to become energized, closing its contact 544 and opening its contact 546. The opening of contact 546 starts the timer 548, which is set to open its normally closed contact 550 after an interval of time just sufficient to permit the tray to reach a position on conveyor 48 in which it is aligned with the branch conveyor 506 (FIG. 16). Simultaneously, relay 552 has become energized from the 110 volt power line through contacts 516, 550 and 540. This in turn causes contact 554 to close, and relay 542 locks itself in through contact 554 and contact 544. At the same time, contact 556 connects the coil of relay 552 directly to contact 550 of timer 548. Therefore, when the tray clears the decoder 156, and contacts 516 and 540 consequently open, relay 552 will remain energized until contact 550 of timer 548 opens. The energization of relay 552 also causes contacts 558 to open and thereby to release relay 560, whose contact 562 thereupon closes, resetting timer 564 to its normal position, i.e. closing contact 566. At the same time, the opening of contacts 568 of relay 560 prevents energization of relay 570.

When the tray reaches its position adjacent branch conveyor 506, timer 548 opens its contacts 550. This causes relay 552 to be released, and contacts 558 once again connect relay 560 to the power line. The consequent opening of contacts 562 starts timer 564, and the closing of contacts 568 while contacts 566 of timer 564 are closed results in energization of relay 570. Contacts 572 lock relay 560 in the energized position, while the opening of contacts 574 releases relay 576 which resets timer 578 to its normal position, i.e. with contacts 580 closed. Upon expiration of its time delay, which is just sufficient to permit the tray to travel from a position in alignment with branch conveyor 506 to a position in alignment with branch conveyor 500, contacts 566 of timer 564 open and release relay 570. The opening of contacts 572 brings relay 560 once again under the sole control of relay 552, and the closing of contacts 574 energizes relay 576 to start timer 578. At the same time, the closing of contacts 582 of relay 576 causes energization of relay 584 through the now closed contacts 580. The energization of relay 554 locks relay 576 in through contacts 586, and the closing of contacts 588 energizes the take-off device 590 which ejects the tray onto branch conveyor 500. The time delay of the timer 578 is so set as to just allow the tray to clear conveyor 48 upon being ejected. Therefore, as soon as tray 100 has cleared conveyor 48, contacts 580 open and release relay 584, thereby stopping the take-off device 590 and returning relay 576 to the exclusive control of relay 570.

It will be noted that as soon as the tray reaches a position aligned with branch conveyor 506, relay 552, timer 548 and relay 542 return to their rest position. These devices are thereupon able to respond to the code of the next following tray. It will be seen from the above description that the distance between the right-hand end (in FIG. 16) of decoding head 142 and the left-hand end of branch conveyor 506, or the distance between the right-hand end of branch conveyor 506 and the left-hand end of branch conveyor 500; whichever is greater, is the minimum spacing required between successive trays.

If a succeeding tray is coded in such a manner as to energize relay 591 (FIG. 20), the closing of its contacts 592 and 594 causes energization of relay 542, starting of timer 548, and energization of relay 596 in the same manner as heretofore described. However, the opening of contacts 598 upon energization of relay 596, instead of resetting timer 564, resets timer 600 by releasing relay 602. Upon the release of relay 596 by the opening of contacts 550 of timer 548, timer 600 starts to run due to the re-energization of relay 602, and the take-off device 604 is simultaneously actuated by relay 606 for a time interval determined by timer 600 which is just sufficient to allow the tray to clear conveyor 48.

It should be kept in mind that although this circuit permits the simultaneous ejection of two trays, one onto each branch conveyor, it requires, as mentioned above, spacing between the trays of sufficient magnitude to allow a tray to reach the ejecting position adjacent branch conveyor 506 before the next tray is cleared through the decoder 156. Likewise, the spacing between the take-off devices 604 and 590 must be small enough so that a tray will reach the take-off device 590 before the next following tray can reach take-off device 604.

2.54.12—*Selective take-off; rotary type.*—In those installations where the distance between the decoder 156 and the branch conveyors 506 and 500, or the distance between the branch conveyors 506 and 500, is too great to permit use of an electronic memory system as previously described the system of FIGS. 21 and 22 is appropriate. In this system, a magnetizable disk 608 is rotatably mounted on a bracket 610 which may in turn be attached to the frame of conveyor 48. A powered roller 612 of conveyor 48 drives a friction gear 614 which rotates disk 608 at a speed proportional to the speed of conveyor 48, i.e. the speed of roller 612. A pair of writing heads 616, 618 are mounted so as to overlie the magnetizable surface of disk 608. A pair of reading heads 620, 622 are mounted along the perimeter of disk 608 at circumferentially adjustable positions. The radial position of reading heads 620 and 622 is such that head 622 reads signals impressed on the disk by writing head 618, and head 620 reads signals impressed by head 616. An erasing head 624 is provided to erase any signals impressed on the disk after they have been read by the reading heads 620, 622.

Turning now to FIG. 21, it will be seen that the energization of wire U by the passage of an appropriately coded tray causes the writing head 618 to magnetize the disk 608 as it passes under head 618. When the leading edge of this magnetic signal reaches reading head 622, it induces a momentary voltage pulse in reading head 622. This pulse is amplified by an amplification stage 626 and is fed to the grid of a cold-cathode, gas-filled tube 628 which it causes to fire. Firing of tube 628 energizes relay 630 which, by opening contact 632, starts the timer 634. At the same time, contacts 636 close to energize the take-off device 590. When sufficient time has elapsed for the tray to clear conveyor 48, contacts 638 of timer 634 open, which removes plate voltage from tube 628 and extinguishes it, causing relay 630 to drop out. The dropping out of relay 630 resets the timer through contacts 632 and stops the take-off device 590 through contacts 636. As soon as relay 630 releases, the resetting of timer 634 causes contact 638 to reclose and re-apply plate voltage to tube 628 so as to ready it for the next signal pulse. The signal pulse induced in reading head 622 by the end of the magnetic signal impressed by writing head 618 will not result in firing of tube 628 because it is of the wrong polarity.

The circuit described above relates to tube 468 and the take-off device 590 associated therewith; an identical circuit would be provided from wire V for writing head 616, reading head 620, and take-off device 604 associated therewith.

Because of the multiple signal storage capacity of disk 608, the system of FIGS. 21, 22 can be used to route any number of trays onto any number of spaced branch conveyors substantially regardless of the spacing of the trays from one another.

2.56—*Eraser.*—The eraser 66 consists, as shown in FIG. 23, of three powerful permanent magnets 161, 162, 163 placed side-by-side. The magnets 161, 162 and 163 each have a north pole and a south pole defining gaps $161x$, $162x$, $163x$, respectively, through which the slugs 116 mounted in the flange 112 of tray 100 (FIG. 3) successively travel. As will be seen most clearly from FIG. 23, gap $161x$ is comparatively narrow, and hence the magnetic field in gap $161x$ is comparatively strong. Gap $162x$ is a little wider, and the magnetic field therethrough is a little weaker. Finally, gap $163x$ is quite wide, and the magnetic field therethrough is correspondingly weak. The action of the eraser 66 is graphically shown in FIG. 24, wherein the line 164 represents the flux in a magnetized slug 116 as the tray 100 to which it is attached travels past the eraser 66, while the line 165 shows the flux in an unmagnetized slug 116 under the same conditions. It will be seen that as a slug 116 travels through gap $161x$, a strong downwardly (in FIG. 23) directed magnetic field is imposed thereupon. If the slug 116 has previously been magnetized by an upwardly directed field such as that of an encoding head magnet 138 (line 164), the effect of this downwardly directed field on the slug 116 will be very strong. If the slug 116 is substantially unmagnetized (line 165), the effect will be considerably less. Since the polarity of magnet 162 is the reverse of the polarity of magnet 161, the subsequent travel of the slug 116 through gap $162x$ will result in an upwardly directed magnetization which is quantitatively less than that caused by the travel through gap $161x$. Finally, since the polarity of magnet 163 is again the reverse of that of magnet 162, the travel of slug 116 through gap $163x$ results in a final downwardly directed magnetization which is quantitatively small and which brings slug 116 down to its normal substantially unmagnetized condition.

2.57—*Flow Control.*—In FIGS. 25a and 25b, a typical flow control system such as may be used at the ticket counter 72 (FIG. 4) has been shown in block diagram form. Throughout FIG. 25, the dotted line indicates the movement of a tray, whereas the solid lines indicate control of one element by another. A tray coming down the main return conveyor 64 eventually reaches a position-responsive element 640, which may be a limit switch or equivalent device. If the take-off device 642 controlled by the switch 640 is able to function, the switch 640 initiates operation of the take-off device 644. The tray is thereupon taken off the main return conveyor 64 and is transferred onto the storage conveyor 84 (see FIG. 1) associated with the take-off 642. As soon as the tray has been taken off the main return conveyor 64, it triggers a limit switch 646 which stops the drive 644. As the tray enters the storage area 648, it passes through a demand sensor 650 which blocks the drive 644 against further operation if the number of trays in the storage area exceeds a predetermined number.

Exit of trays from the storage area 648 is controlled by a tray stop or gate 651. Since, in the example described herein, it would probably be expedient to have the ticket counter at one level and the remainder of the system at another level, a lift 652 driven by a motor 654 is provided to move the trays from the storage area level up to the ticket counter level (assuming the ticket counter level is above the storage area level). The tray stop 651 may be automatically deactivated to permit passage of one tray onto the lift 652 when the lift 652 reaches the bottom end of its travel. Likewise, the tray may be discharged from the lift 652 by deactivating a tray stop 656 when the lift 652 reaches the top end of its travel. For safety reasons, it would normally be desirable to make the top position of the lift its rest position. When the tray has rolled onto the lift 652, it trips a limit switch or trigger 658 which actuates the motor 654 to raise the lift. As the lift 652 now reaches the top end of its travel and tray stop 656 is deactivated, the tray begins to roll off lift 652 but is stopped by the preceding tray which is held in the loading position 657 (FIG. 4) by scale entrance tray stop 659 which is arranged to be manually released by the ticket agent whenever a tray is ready to be weighed. If the loading position 657 is clear and the tray rolls off the lift 652 into loading position 657, it trips a photoelectric control 660 which actuates the motor 654 to lower the lift to pick up another tray from storage area 648.

A tray loaded by the passenger at the loading position 657 and released onto the scale 690 by the ticket agent rolls into the release position 662 of the scale 690. In doing so, it activates the position-shift tray stop 663 so that a subsequent tray forming part of the same passenger's baggage will stop in the stand-by position 664 of scale 690. After weighing both trays and ticketing the baggage if necessary, the ticket agent sets up the flight number on the encoder console 124 and depresses its "release" key 134 (FIG. 5). The "release" key 134 deactivates the scale exit tray stop 668 for the double function of releasing the first tray into the encoding mechanism and replacing it with the second tray from the stand-by position 664, the latter being automatically accomplished when the departure of the first tray from the realease position 662 deactivates the position-shift tray stop 663. The tray is now conveyed through the encoding head 126 where its destination code is impressed upon it, and it eventually reaches the tray stop 669 which, when de-activated by the lift 672 at the top end of its travel, permits the tray to enter the lift 672. When the tray is in position on lift 652, it trips a trigger or limit switch 674 which actuates the motor 676 to lower the tray back down to the main level of the conveyor system.

When the lift 672 reaches the bottom end of its travel, it de-activates the tray stop 678 and permits the tray to roll off the lift 672. As soon as the tray has cleared the lift 672, it trips a return switch 680 which actuates the motor 676 of lift 672 to return the lift 672 to its top or rest position to pick up the second tray. As the lift 672 returns to its top position, it momentarily opens "ready" switch 300 to enable the encoder mechanism to release the second tray.

If the tray is discharged from the lift 672 in a direction normal to its direction of arrival thereon (see FIG. 4), as may be necessary where space is limited, it can be restored to a longitudinal direction of travel by a right angle transfer 682 actuated by a drive 684 as it reaches the proper position, and is automatically stopped when the tray has cleared the transfer device and trips a stop switch 688. The tray is now ready to enter the system over the outgoing feed conveyor 46.

Considering FIG. 4 in detail now, it shows a possible physical layout for a ticket counter according to this invention. A tray travels from the storage area 648 onto the lift 652. The limit switch 658 raises the lift 652 to the level of the hall in which the ticket counter 72 is located. Upon discharge from the lift 652, the tray actuates the photoelectric return control 660 to lower lift 652 to pick up another tray. Manually operated tray stop 659 feeds the trays from the loading position 657 one at a time onto scale 690 where two trays may be weighed simultaneously. Upon actuation of the "release" key 134 (FIG. 5) of encoder console 124, tray stop 668 is de-activated to release the first tray from scale 690 past encoding head 126. The release of the first tray automatically de-activates tray stop 663 and advances the second tray from the stand-by position 664 to the release position 662. Limit switch 692 reactivates tray stop 668 as soon as the release tray has cleared the tray stop 668. The tripping of limit switch 306 by the passing tray fires the mechanism of the encoder to cause encoding head 126 to impress a code upon the tray. Accurate passage of the tray through the encoding head 126 may be assured by a spring-biased, motor-driven guide wheel 670 which engages the side of the tray and moves it forward at a predetermined speed. Tray stop 669, when released, permits entry of the tray upon lift 672, which, upon actuation of the limit switch 674 by the tray, lowers the tray onto the out-going feed conveyor 46. Upon its return to its top position, the lift 672 clears the mechanism for the release of the next tray by tripping "ready" switch 300 and closing limit switch 288.

*Summary*

It will be seen from the foregoing description that this invention provides a novel and efficient system of automatic baggage handling, whose principles can be readily applied with obvious modifications to the handling of any goods or merchandise which can be encoded and then subsequently sorted according to criteria varying as a function of time. It is therefore to be understood that the present invention is not to be limited to the embodiment or use described herein, which is given as a matter of illustration only, but that the concepts disclosed herein are to be limited only by the broadest possible interpretation of the following claims.

I claim:

1. In a materials handling system having a recirculating main conveyor, at least one feed conveyor feeding thereinto, a plurality of branch conveyors exiting therefrom, a plurality of material carrying trays, and means for selectively diverting said trays from said main conveyor to said branch conveyors, the combination comprising:

a longitudinally protruding flange on the side of each said tray, said flange having a plurality of bistable magnetic slugs imbedded in its surface at predetermined intervals;

an encoding station positioned along said feed conveyor having a write head with a longitudinal guide slot adapted to receive said flange and having a plurality of electromagnetic winding means positioned therealong in such a manner that one such winding means spatially matches each of said slugs on each said tray;

means for guiding said flange into said write head slot;

means for selectively arming certain of said electromagnetic winding means according to a predetermined code which is indicative of some characteristic of the material contained in one of said trays;

means for activating said armed electromagnetic winding means only when said winding means and their respective matching slugs are adjacent each other whereby the slugs on said one of said trays have a magnetic signal impressed thereon which is indicative of a characteristic of the material in that tray;

a decoding station positioned along said recirculating conveyor, said decoding station having a read head with a longitudinal guide slot adapted to receive said flange and having a plurality of electromagnetic sensing elements positioned therealong in such a manner that one such element spatially matches each said slug on each said tray;

means for guiding said flange into the read head slot;

means for activating said sensing elements only when said elements and their respective matching slugs on a given tray are adjacent each other, whereby a signal which is indicative of a characteristic of the material in that tray is obtained;

means associated with each said branch conveyor for generating an exit signal indicative of the particular type of material which it is desired to divert from said main conveyor onto that particular branch conveyor;

means for comparing the decoded signal from said decoding station with the signals generated by said generating means; and delay means for activating the diverting means associated with the branch conveyor whose exit signal bears a predetermined relationship to said decoded signal whereby said given tray is diverted when it passes adjacent that branch conveyor.

2. The combination as set forth in claim 1 which further comprises:

an auxiliary conveyor means for returning said trays from the outputs of said branch conveyors to the input of said feed conveyors; and means positioned along said auxiliary conveyor for erasing any magnetic signal remaining on the slugs associated with the passing trays.

3. The combination as set forth in claim 2 wherein each of said electromagnetic winding means has an air gap therein and where said slugs pass through said air gap as said flange passes through said slot.

4. The combination as set forth in claim 3 wherein said means for activating said armed electromagnetic winding means comprises a switch which is tripped by said tray as said tray reaches a predetermined spatial position with respect to said encoding station.

5. The combination as set forth in claim 4 wherein said sensing elements are reed switches and wherein said means for activating said sensing elements comprises a plurality of bias coils generating a threshold magnetic field whereby when said threshold magnetic field and the magnetic field generated by one of said slugs are unidirectional the associated reed switch will close.

References Cited by the Examiner

UNITED STATES PATENTS 3,086,121 4/1963 Cockrell.
3,168,053 2/1965 Miroux _____ 198—38 X EVON C. BLUNK, *Primary Examiner.*

R. E. KRISHER, *Assistant Examiner.*